United States Patent
Merg et al.

(10) Patent No.: US 12,159,017 B2
(45) Date of Patent: *Dec. 3, 2024

(54) SYSTEM AND METHOD FOR PROVIDING AN INTERACTIVE VEHICLE DIAGNOSTIC DISPLAY

(71) Applicant: Snap-on Incorporated, Kenosha, WI (US)

(72) Inventors: Patrick S. Merg, Hollister, CA (US); Todd Mercer, Descanso, CA (US); Roy Steven Brozovich, Campbell, CA (US); David Costantino, San Diego, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,798

(22) Filed: May 3, 2021

(65) Prior Publication Data

US 2021/0255757 A1    Aug. 19, 2021

Related U.S. Application Data

(63) Continuation of application No. 16/542,276, filed on Aug. 15, 2019, now Pat. No. 11,029,813, which is a
(Continued)

(51) Int. Cl.
*G06F 17/00*    (2019.01)
*G05B 23/02*    (2006.01)
(Continued)

(52) U.S. Cl.
CPC ..... *G06F 3/04817* (2013.01); *G05B 23/0216* (2013.01); *G06F 3/0482* (2013.01);
(Continued)

(58) Field of Classification Search
CPC ............. G06F 3/04817; G06F 3/04847; G06F 3/0483; G06F 3/0488; G06F 2203/04806; H04W 4/70; G05B 23/0216; G07C 5/08
(Continued)

(56) References Cited

U.S. PATENT DOCUMENTS 3,955,135 A    5/1976    Fastaia
5,214,582 A    5/1993    Gray
(Continued)

FOREIGN PATENT DOCUMENTS

CN    101421128 A    4/2009
CN    102460068 A    5/2012
(Continued)

OTHER PUBLICATIONS

Chinese National Intellectual Property Administration; Office Action for Chinese Patent Application No. 201780061747.X; dated Nov. 1, 2021.
(Continued)

*Primary Examiner* — Jason T Edwards
(74) *Attorney, Agent, or Firm* — McDonnell Boehnen Hulbert & Berghoff LLP

(57) ABSTRACT

A client computing system (CCS) receives a download including (i) an image representative of at least one circuit in a vehicle, the at least one circuit including a first circuit configured for carrying a first signal within the vehicle, and (ii) symbol data associated with at least one symbol, the at least one symbol including a first symbol. After receiving the download, the CCS displays the image and the at least one symbol. The CCS then receives a first input corresponding to selection of the first symbol. The CCS then responsively receives, from the vehicle, data representing value(s) of the first signal. The CCS then determines a first display-location at which to display the data representing the value(s) of the
(Continued)

first signal. While the image and the at least one symbol are displayed, the CCS then displays, at the first display-location, the data representing the value(s) of the first signal.

23 Claims, 13 Drawing Sheets

Related U.S. Application Data continuation of application No. 15/286,146, filed on Oct. 5, 2016, now Pat. No. 10,430,021.

(51) Int. Cl.
| | | |
|---|---|---|
| *G06F 3/04817* | (2022.01) | |
| *G06F 3/0482* | (2013.01) | |
| *G06F 3/04847* | (2022.01) | |
| *H04W 4/70* | (2018.01) | |
| *G06F 3/0483* | (2013.01) | |
| *G06F 3/0488* | (2022.01) | |
| *G07C 5/00* | (2006.01) | |

(52) U.S. Cl.
CPC .......... *G06F 3/04847* (2013.01); *H04W 4/70* (2018.02); *G06F 3/0483* (2013.01); *G06F 3/0488* (2013.01); *G06F 2203/04806* (2013.01); *G07C 5/008* (2013.01); *G07C 2205/02* (2013.01)

(58) Field of Classification Search
USPC ......................................................... 715/763
See application file for complete search history.

(56) References Cited

U.S. PATENT DOCUMENTS

| | | | |
|---|---|---|---|
| 5,220,559 A | 6/1993 | Tsuzuki | |
| 5,434,599 A | 7/1995 | Hirai et al. | |
| 5,774,361 A | 6/1998 | Colarelli, III et al. | |
| 5,923,161 A | 7/1999 | Frankovitch, Jr. et al. | |
| 6,154,122 A | 11/2000 | Menze | |
| 6,204,770 B1 | 3/2001 | Johnson | |
| 6,205,395 B1 | 3/2001 | Young et al. | |
| 6,301,531 B1 | 10/2001 | Pierro et al. | |
| 6,760,380 B1 | 7/2004 | Andersen | |
| 6,823,243 B2 | 11/2004 | Chinnadurai et al. | |
| 6,969,983 B2 | 11/2005 | Lipscomb et al. | |
| 7,245,210 B2 | 7/2007 | Konno | |
| 7,555,376 B2 | 6/2009 | Beronja | |
| 7,636,622 B2 | 12/2009 | Underdal et al. | |
| 7,636,676 B1 | 12/2009 | Wolery et al. | |
| 7,912,602 B2 | 3/2011 | Sells et al. | |
| 7,945,438 B2 | 5/2011 | Balmelli et al. | |
| 8,060,347 B2 | 11/2011 | Dong et al. | |
| 8,095,394 B2 | 1/2012 | Nowak et al. | |
| 8,924,913 B1* | 12/2014 | Goh ........................ G06F 30/30 | |
| | | | 716/139 |
| 8,983,785 B2 | 3/2015 | Panko | |
| 9,105,120 B2 | 8/2015 | Shimoyama et al. | |
| 9,213,332 B2 | 12/2015 | Fish et al. | |
| 9,361,738 B2 | 6/2016 | Gilbert et al. | |
| 9,378,601 B2 | 6/2016 | Ricci | |
| 9,448,969 B2 | 9/2016 | Schumacher | |
| 9,590,596 B1 | 3/2017 | Lee | |
| 9,633,484 B2 | 4/2017 | Fazi | |
| 9,639,996 B2 | 5/2017 | Treharne | |
| 9,714,771 B1 | 7/2017 | Goodman et al. | |
| 9,805,263 B2 | 10/2017 | Schneider et al. | |
| 9,928,544 B1 | 3/2018 | Hasan | |
| 9,934,354 B1 | 4/2018 | Kukal et al. | |
| 2002/0007289 A1 | 1/2002 | Malin et al. | |
| 2002/0135610 A1* | 9/2002 | Ootani ..................... H04L 41/22 | |
| | | | 715/734 |
| 2003/0019293 A1 | 1/2003 | Sirrine | |
| 2004/0139238 A1 | 7/2004 | Uhrs | |
| 2005/0027403 A1 | 2/2005 | Nagai | |
| 2005/0110543 A1 | 5/2005 | Touya et al. | |
| 2005/0192727 A1 | 9/2005 | Shostak et al. | |
| 2005/0193252 A1 | 9/2005 | Cancilla et al. | |
| 2005/0235955 A1 | 10/2005 | Katrak et al. | |
| 2006/0025897 A1 | 2/2006 | Shostak et al. | |
| 2006/0078175 A1 | 4/2006 | Brozovich | |
| 2006/0085158 A1 | 4/2006 | Cakiner | |
| 2006/0106509 A1 | 5/2006 | Robb et al. | |
| 2006/0123692 A1 | 6/2006 | Beronja | |
| 2006/0142908 A1 | 6/2006 | Grier et al. | |
| 2006/0170409 A1 | 8/2006 | Kagan et al. | |
| 2006/0180371 A1 | 8/2006 | Breed et al. | |
| 2006/0193354 A1 | 8/2006 | Rosenblatt | |
| 2006/0212194 A1 | 9/2006 | Breed | |
| 2007/0032207 A1 | 2/2007 | Shah | |
| 2007/0069734 A1* | 3/2007 | Bertness .................. H02J 7/008 | |
| | | | 324/411 |
| 2007/0097398 A1* | 5/2007 | Walton ................... G06T 15/205 | |
| | | | 358/1.13 |
| 2007/0100520 A1 | 5/2007 | Shah et al. | |
| 2007/0192739 A1* | 8/2007 | Hunleth ................ G06F 3/0481 | |
| | | | 725/39 |
| 2007/0208464 A1 | 9/2007 | Moorhead | |
| 2007/0271014 A1 | 11/2007 | Breed | |
| 2007/0294001 A1 | 12/2007 | Underdal et al. | |
| 2007/0294002 A1* | 12/2007 | Underdal ................. G07C 5/08 | |
| | | | 701/29.1 |
| 2007/0295800 A1 | 12/2007 | Staats | |
| 2008/0021662 A1* | 1/2008 | Hinn ....................... G01M 3/38 | |
| | | | 702/33 |
| 2008/0147267 A1 | 6/2008 | Plante et al. | |
| 2008/0183409 A1 | 7/2008 | Roberts et al. | |
| 2008/0243488 A1 | 10/2008 | Balmelli et al. | |
| 2009/0144622 A1 | 6/2009 | Evans et al. | |
| 2009/0146997 A1 | 6/2009 | Sato | |
| 2009/0157248 A1 | 6/2009 | Gilbert | |
| 2009/0201315 A1 | 8/2009 | Nishida | |
| 2009/0204310 A1 | 8/2009 | Gittere | |
| 2009/0232038 A1 | 9/2009 | Gonzalez-Velazquez | |
| 2009/0259358 A1 | 10/2009 | Andreasen | |
| 2009/0265055 A1 | 10/2009 | Gillies | |
| 2009/0300548 A1 | 12/2009 | Sullivan et al. | |
| 2010/0017746 A1* | 1/2010 | Husoy ...................... G06F 9/451 | |
| | | | 700/83 |
| 2010/0042952 A1 | 2/2010 | Geesey | |
| 2010/0138701 A1 | 6/2010 | Costantino | |
| 2011/0035094 A1 | 2/2011 | Van Den Berg et al. | |
| 2011/0072338 A1 | 3/2011 | Caldwell | |
| 2011/0191711 A1 | 8/2011 | Gill et al. | |
| 2011/0191722 A1 | 8/2011 | Gill et al. | |
| 2011/0209074 A1 | 8/2011 | Gill et al. | |
| 2012/0217111 A1 | 8/2012 | Boys et al. | |
| 2012/0259884 A1 | 10/2012 | Donehue | |
| 2013/0054082 A1 | 2/2013 | Costantino | |
| 2013/0218522 A1 | 8/2013 | Suzuki et al. | |
| 2013/0246135 A1 | 9/2013 | Wang | |
| 2013/0261874 A1 | 10/2013 | McQuade et al. | |
| 2013/0268298 A1 | 10/2013 | Elkins et al. | |
| 2013/0301875 A1 | 11/2013 | Schumacher | |
| 2013/0317694 A1 | 11/2013 | Merg et al. | |
| 2013/0328661 A1 | 12/2013 | Phillips et al. | |
| 2014/0005881 A1 | 1/2014 | Hardesty | |
| 2014/0052531 A1 | 2/2014 | Kent et al. | |
| 2014/0053092 A1 | 2/2014 | Grevinga et al. | |
| 2014/0074345 A1 | 3/2014 | Gabay et al. | |
| 2014/0075356 A1 | 3/2014 | Gray et al. | |
| 2014/0075362 A1 | 3/2014 | Gray et al. | |
| 2014/0249935 A1 | 9/2014 | Daily, IV et al. | |
| 2014/0277908 A1 | 9/2014 | Fish et al. | |
| 2014/0279169 A1 | 9/2014 | Leos | |
| 2014/0350774 A1 | 11/2014 | Mouzakitis et al. | |
| 2014/0371977 A1 | 12/2014 | Sumi et al. | |
| 2015/0039176 A1* | 2/2015 | Fish ......................... G07C 5/008 | |
| | | | 701/31.6 |
| 2015/0051787 A1* | 2/2015 | Doughty ................ B60R 16/023 | |
| | | | 701/31.5 |

(56) References Cited

U.S. PATENT DOCUMENTS

| | | |
|---|---|---|
| 2015/0066781 A1 | 3/2015 | Johnson et al. |
| 2015/0105934 A1 | 4/2015 | Palmer et al. |
| 2015/0121275 A1 | 4/2015 | Marshall et al. |
| 2015/0221107 A1 | 8/2015 | Thao et al. |
| 2015/0226778 A1 | 8/2015 | Weber |
| 2015/0277404 A1 | 10/2015 | Maturana et al. |
| 2015/0317065 A1 | 11/2015 | Meriaz et al. |
| 2015/0350611 A1* | 12/2015 | Pearson ............... H04L 65/762 348/158 |
| 2015/0371455 A1 | 12/2015 | Abdel-Rahman et al. |
| 2015/0371461 A1 | 12/2015 | Treharne |
| 2016/0078691 A1 | 3/2016 | Roepke |
| 2016/0086390 A1 | 3/2016 | Berkobin |
| 2016/0094234 A1 | 3/2016 | Chou et al. |
| 2016/0098369 A1 | 4/2016 | Berkobin |
| 2016/0124587 A1 | 5/2016 | Covington et al. |
| 2016/0124635 A1 | 5/2016 | Covington et al. |
| 2016/0163129 A1 | 6/2016 | Elnajjar |
| 2016/0179359 A1 | 6/2016 | Kodejs et al. |
| 2016/0231370 A1* | 8/2016 | Fasnacht ............... G01R 31/52 |
| 2016/0247331 A1* | 8/2016 | Cacabelos ............ G07C 5/0808 |
| 2016/0284128 A1* | 9/2016 | Michalscheck ...... G05B 19/409 |
| 2016/0302730 A1 | 10/2016 | Odale |
| 2016/0335073 A1 | 11/2016 | Hong |
| 2017/0039059 A1 | 2/2017 | Gintz et al. |
| 2017/0151971 A1 | 6/2017 | Shubs, Jr. et al. |
| 2017/0169625 A1 | 6/2017 | Avie et al. |
| 2017/0177757 A1 | 6/2017 | Thorley et al. |
| 2017/0214888 A1 | 7/2017 | Bai et al. |
| 2017/0221229 A1 | 8/2017 | Perrier et al. |
| 2017/0289823 A1 | 10/2017 | Huang et al. |
| 2017/0352104 A1 | 12/2017 | Hanson et al. |
| 2017/0372532 A1 | 12/2017 | Merg et al. |
| 2018/0047223 A1 | 2/2018 | Lewis et al. |
| 2018/0095609 A1 | 4/2018 | Merg et al. |
| 2018/0095638 A1 | 4/2018 | Merg et al. |
| 2019/0369821 A1 | 12/2019 | Merg et al. |
| 2019/0369843 A1 | 12/2019 | Merg et al. |
| 2022/0027023 A1 | 1/2022 | Merg et al. |
| 2022/0230446 A1 | 7/2022 | Miyamoto et al. |

FOREIGN PATENT DOCUMENTS

| | | |
|---|---|---|
| CN | 102754140 A | 10/2012 |
| CN | 103180793 A | 6/2013 |
| CN | 104657034 A | 5/2015 |
| CN | 104880323 A | 9/2015 |
| CN | 105278519 A | 1/2016 |
| CN | 105579822 A | 7/2017 |
| WO | 2011/002441 A1 | 1/2011 |

OTHER PUBLICATIONS

Neumann, P. and Iwanitz, F., Integration of Fieldbus Systems Into Distributed Object-Oriented Systems, Proceedings, IEEE International Workshop on Factory Communication Systems, 1997, Barcelona, Spain, Oct. 1-3, 997, New York, NY, USA, IEEE, pp. 247-253 (7 pages).

International Search Report, International Application No. PCT/US2017/050788, dated Dec. 20, 2017 (3 pages).

Written Opinion of the International Searching Authority, International Application No. PCT/US2017/050788, dated Dec. 20, 2017 (9 pages).

1A Auto; Watch. Do. Save; downloaded from https://web.archive.org/web/20160406095034/http://www.1aauto.com/? as archived on Apr. 6, 2016 (2 pages).

gearchatter.com: DTC P0342 Camshaft Position (CMP) Sensor Circuit Low Voltage, downloaded from http://www.gearchatter.com/viewpost12642.php on May 26, 2016; posted Nov. 11, 2004 (4 pages).

Keysight Technologies; Keysight EEsof EDA; Microwave Amplifier Design and Smith Chart Utility for Z Matching Network, Demo Guide; published Jun. 27, 2016 (29 pages).

Keysight Technologies; Advanced Design System (ADS); downloaded from http://www.keysighl.com/en/oc-1297113/advanced-design-system-ads?nid =-34346.0&cc=US&lc-eng on Nov. 9, 2016 (1 page).

National Instruments, NI AWR Design Environment; RF/Microwave Circuit Design Software; downloaded from http://www.awrcorp.com/products/ni-awr-design-environment/microwave-office on Nov. 9, 2016 (2 pages).

Sun; Snap-on UK Holdings Lid .; DGA 2500 Diagnostic Gas Analyser Operator's Manual; Software Version V 2.1.0.14, Models EEEA132; 2002 (110 pages).

U.S. Appl. No. 10/971,059, filed Oct. 25, 2004, inventor. Jim Cancilla.

European Patent Office; Communication pursuant to Article 94(3) EPC for European patent application No. 17 777 687.9-1224; 13 pages, dated Mar. 1, 2022.

China National Intellectual Property Administration; office action for Chinese Patent Application No. 202210430289.5; May 9, 2024, with English translation.

* cited by examiner

```
┌─────────────────────────────────────────────────────────────┐
│   RECEIVING A DOWNLOAD INCLUDING (I) AN IMAGE              │
│ REPRESENTATIVE OF A VEHICLE COMPONENT, (II) SYMBOL DATA    │
│  ASSOCIATED WITH A FIRST SYMBOL, (III) A SET OF SELECTABLE │
│    IDENTIFIERS, AND (IV) SUPPLEMENTAL INFORMATION          │
│         ASSOCIATED WITH THE VEHICLE COMPONENT              │
└─────────────────────────────────────────────────────────────┘
                              │
                              ▼                    ─── 231
┌─────────────────────────────────────────────────────────────┐
│  DISPLAYING, AFTER RECEIVING THE DOWNLOAD, THE IMAGE        │
│  AND THE FIRST SYMBOL WITHOUT DISPLAYING THE SET OF         │
│              SELECTABLE IDENTIFIERS                         │
└─────────────────────────────────────────────────────────────┘
                              │
                              ▼                    ─── 232
┌─────────────────────────────────────────────────────────────┐
│  RECEIVING, WHILE THE IMAGE AND THE FIRST SYMBOL ARE        │
│  DISPLAYED ON THE DISPLAY WITHOUT THE SET OF SELECTABLE     │
│  IDENTIFIERS, A FIRST INPUT CORRESPONDING TO SELECTION OF   │
│                   THE FIRST SYMBOL                          │
└─────────────────────────────────────────────────────────────┘
                              │
                              ▼                    ─── 233
┌─────────────────────────────────────────────────────────────┐
│  DISPLAYING, IN RESPONSE TO RECEIVING THE FIRST INPUT, THE  │
│            SET OF SELECTABLE IDENTIFIERS                    │
└─────────────────────────────────────────────────────────────┘
                              │
                              ▼                    ─── 234
┌─────────────────────────────────────────────────────────────┐
│  RECEIVING, WHILE THE SET OF SELECTABLE IDENTIFIERS IS      │
│  DISPLAYED, A SECOND INPUT CORRESPONDING TO SELECTION       │
│  OF A FIRST SELECTABLE IDENTIFIER FROM THE DISPLAYED SET    │
│              OF SELECTABLE IDENTIFIERS                      │
└─────────────────────────────────────────────────────────────┘
                              │
                              ▼                    ─── 235
┌─────────────────────────────────────────────────────────────┐
│  DISPLAYING, IN RESPONSE TO RECEIVING THE SECOND INPUT,     │
│   THE RESPECTIVE PORTION OF THE SUPPLEMENTAL                │
│  INFORMATION INDICATED BY THE FIRST SELECTABLE IDENTIFIER   │
└─────────────────────────────────────────────────────────────┘
                                                   ─── 236
 ↗
230                         FIG. 3
```

```
┌─────────────────────────────────────────────────────────────┐
│  RECEIVING A DOWNLOAD INCLUDING (I) AN IMAGE                │
│ REPRESENTATIVE OF AT LEAST ONE CIRCUIT IN A VEHICLE, THE AT │
│  LEAST ONE CIRCUIT INCLUDING A FIRST CIRCUIT CONFIGURED FOR │
│  CARRYING A FIRST SIGNAL WITHIN THE VEHICLE, AND (II) SYMBOL│
│   DATA ASSOCIATED WITH AT LEAST ONE SYMBOL, THE AT LEAST    │
│            ONE SYMBOL INCLUDING A FIRST SYMBOL              │
└─────────────────────────────────────────────────────────────┘
                              │  ↘ 391
                              ▼
┌─────────────────────────────────────────────────────────────┐
│   DISPLAYING, ON A DISPLAY AFTER RECEIVING THE DOWNLOAD,    │
│            THE IMAGE AND THE AT LEAST ONE SYMBOL            │
└─────────────────────────────────────────────────────────────┘
                              │  ↘ 392
                              ▼
┌─────────────────────────────────────────────────────────────┐
│  RECEIVING, WHILE THE IMAGE AND THE AT LEAST ONE SYMBOL     │
│ ARE DISPLAYED ON THE DISPLAY, A FIRST INPUT CORRESPONDING   │
│              TO SELECTION OF THE FIRST SYMBOL               │
└─────────────────────────────────────────────────────────────┘
                              │  ↘ 393
                              ▼
┌─────────────────────────────────────────────────────────────┐
│  RECEIVING, FROM THE VEHICLE IN RESPONSE TO RECEIVING THE   │
│   FIRST INPUT, DATA REPRESENTING AT LEAST ONE VALUE OF THE  │
│                         FIRST SIGNAL                        │
└─────────────────────────────────────────────────────────────┘
                              │  ↘ 394
                              ▼
┌─────────────────────────────────────────────────────────────┐
│  DETERMINING A FIRST DISPLAY-LOCATION ON THE DISPLAY AT     │
│ WHICH TO DISPLAY THE DATA REPRESENTING THE AT LEAST ONE     │
│                  VALUE OF THE FIRST SIGNAL                  │
└─────────────────────────────────────────────────────────────┘
                              │  ↘ 395
                              ▼
┌─────────────────────────────────────────────────────────────┐
│  DISPLAYING, ON THE DISPLAY AT THE FIRST DISPLAY-LOCATION   │
│    WHILE THE IMAGE AND THE AT LEAST ONE SYMBOL ARE          │
│  DISPLAYED ON THE DISPLAY, THE DATA REPRESENTING THE AT     │
│            LEAST ONE VALUE OF THE FIRST SIGNAL              │
└─────────────────────────────────────────────────────────────┘
                                 ↘ 396
     ↗
    390                       FIG. 7
```

ID DIAGNOSTIC
SYSTEM AND METHOD FOR PROVIDING AN INTERACTIVE VEHICLE DIAGNOSTIC DISPLAY

REFERENCE TO RELATED APPLICATION

This application is a continuation application of U.S. patent application Ser. No. 16/542,276 filed Aug. 15, 2019. U.S. patent application Ser. No. 16/542,276 is a continuation application of U.S. patent application Ser. No. 15/286,146 filed Oct. 5, 2016 and was published as United States Patent Application Publication No. 2019/0369843 A1 on Dec. 5, 2019. U.S. patent application Ser. No. 15/286,146 published as United States Patent Application Publication No. 2018/0095638 A1 on Apr. 5, 2018 and issued as U.S. Pat. No. 10,430,021 on Oct. 1, 2019. U.S. patent application Ser. No. 16/542,276, U.S. patent application Ser. No. 15/286,146, United States Patent Application Publication No. 2019/0369843 A1, and United States Patent Application Publication No. 2018/0095638 A1 are incorporated herein by reference.

BACKGROUND

Most vehicles are serviced at least once during their useful life. In many instances, a vehicle is serviced at a facility with professional mechanics (e.g., technicians), though in other instances, technicians and/or other professionals (or non-professionals) who are servicing the vehicle can do so at other locations, such as on the road. The technicians can use any of a variety of computerized tools and/or non-computerized tools to service (e.g., repair) any of the wide variety of mechanical vehicle components on a vehicle. While servicing a vehicle, a technician may desire to see information related to various vehicle components, such as circuits in a wiring harness of the vehicle, so that the technician can more accurately and quickly diagnose the vehicle.

Overview

Several example embodiments that relate to interactive vehicle diagnostic displays are described herein.

Viewed from one aspect, an example embodiment takes the form of a method comprising: (a) receiving, by at least one processor of a computing device, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; (b) displaying, on a display after receiving the download, the image and the at least one symbol; (c) receiving, by the at least one processor while the image and the at least one symbol are displayed on the display, a first input corresponding to selection of the first symbol; (d) receiving, by the at least one processor from the vehicle in response to receiving the first input, data representing at least one value of the first signal; (e) determining, by the at least one processor, a first display-location on the display at which to display the data representing the at least one value of the first signal; and (f) displaying, on the display at the first display-location while the image and the at least one symbol are displayed on the display, the data representing the at least one value of the first signal.

Viewed from another aspect, an example embodiment takes the form of a system comprising: a display, at least one processor, and data storage comprising instructions executable by the at least one processor to cause the system to perform operations comprising: (a) receiving, by the at least one processor, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; (b) displaying, on the display after receiving the download, the image and the at least one symbol; (c) receiving, by the at least one processor while the image and the at least one symbol are displayed on the display, a first input corresponding to selection of the first symbol; (d) receiving, by the at least one processor from the vehicle in response to receiving the first input, data representing at least one value of the first signal; (e) determining, by the at least one processor, a first display-location on the display at which to display the data representing the at least one value of the first signal; and (f) displaying, on the display at the first display-location while the image and the at least one symbol are displayed on the display, the data representing the at least one value of the first signal.

Viewed from yet another aspect, an example embodiment takes the form of a non-transitory computer readable medium having stored thereon instructions that, upon execution by a computing system, cause the computing system to perform operations comprising: (a) receiving, by at least one processor of the computing system, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; (b) displaying, on a display after receiving the download, the image and the at least one symbol; (c) receiving, by the at least one processor while the image and the at least one symbol are displayed on the display, a first input corresponding to selection of the first symbol; (d) receiving, by the at least one processor from the vehicle in response to receiving the first input, data representing at least one value of the first signal; (e) determining, by the at least one processor, a first display-location on the display at which to display the data representing the at least one value of the first signal; and (f) displaying, on the display at the first display-location while the image and the at least one symbol are displayed on the display, the data representing the at least one value of the first signal.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 3 is a flowchart depicting a set of functions that can be carried out in accordance with the example embodiments.

FIG. 7 is a flowchart depicting a set of functions that can be carried out in accordance with the example embodiments.

DETAILED DESCRIPTION

I. Introduction

Figure 1:
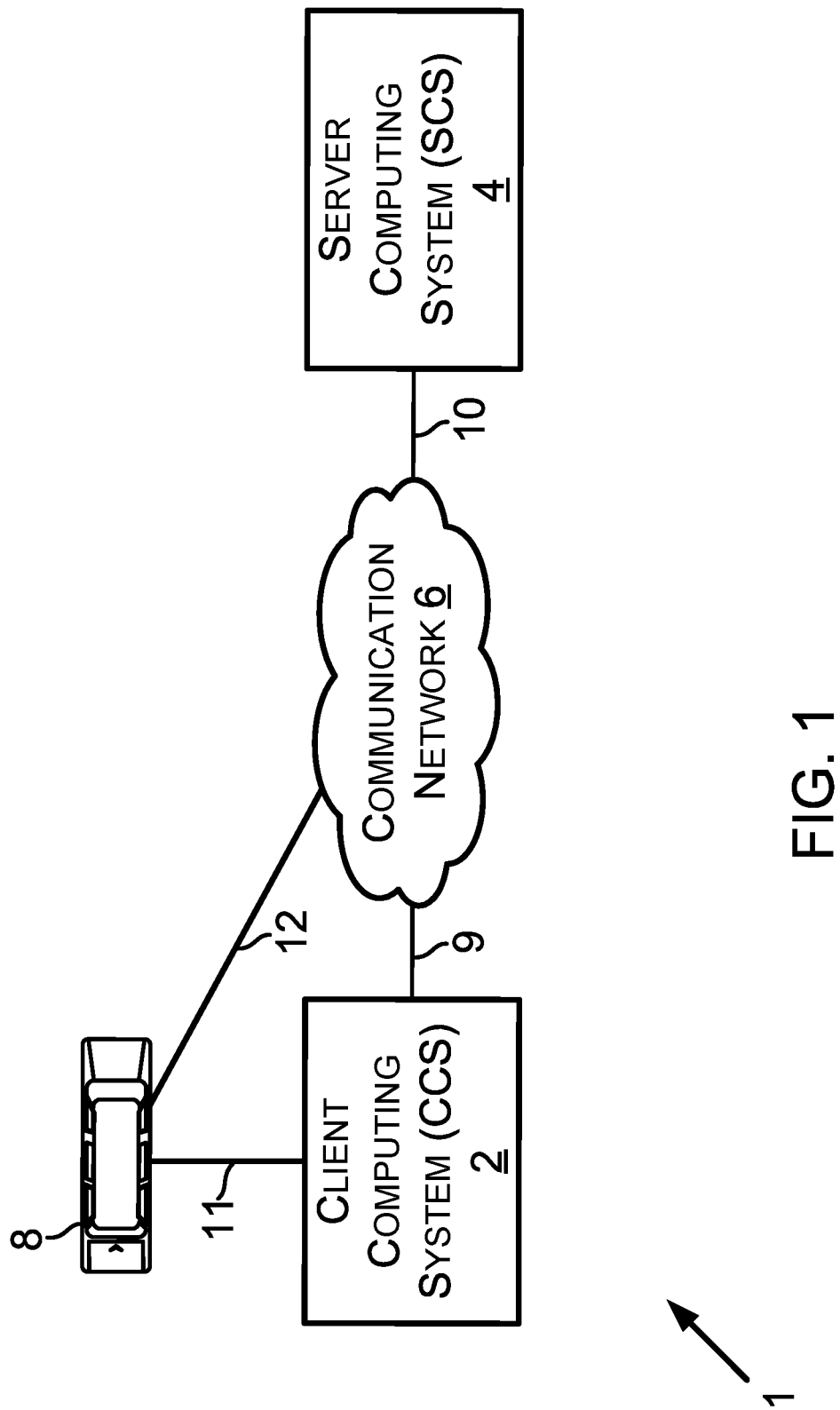
FIG. 1 is a diagram showing an example operating environment in which the example embodiments can operate.

This description describes several example embodiments, at least some which pertain to interactive vehicle diagnostic displays. The example embodiments can include a first device, such as a client computing system (or more simply, "client" or "CCS"), receiving from a second device, such as a server computing system (or more simply, "server" or "SCS"), a download including data for enabling a user of the CCS (e.g., a technician) to view at least one vehicle component as well as supplemental information associated with each vehicle component. For instance, in accordance with the example embodiments, the download can include (i) an image representative of a vehicle component (e.g., an image of a wiring harness), (ii) symbol data associated with a first symbol, (iii) a set of one or more selectable identifiers, and (iv) supplemental information associated with the vehicle component, where each selectable identifier of the set can indicate (e.g., identify) a respective portion of the supplemental information associated with the vehicle component. Supplemental information can include diagnostic information and/or other types of information.

As such, one or more of the example embodiments can comprise, after receiving the download, the CCS displaying the image and the first symbol, without displaying any other information associated with the vehicle component that was included in the download. While displaying the image and the first symbol, the CCS can next receive user-input corresponding to user selection of the first symbol, and can responsively display the set of selectable identifiers. Then, while displaying the set of selectable identifiers, the CCS can receive another user-input corresponding to user selection of one of the selectable identifiers and can responsively display the portion of supplemental information indicated by the selected identifier.

A download received at a CCS can comprise a variety of download content (or more simply "content"). In general, the content of the download can comprise, for example, images, symbol data, supplemental information associated with a vehicle component, identifiers of respective portions of the supplemental information, and/or links to additional download content. For example, a download received at the CCS can include enough data for enabling the technician to seamlessly and efficiently view information associated with the vehicle component without necessitating download of additional information associated with the vehicle component. As another example, a download received at the CCS can include (i) a subset of the images, symbol data, identifiers, and/or supplemental information associated with a vehicle component, and (ii) a hyperlink or other mechanism for providing the SCS with a request for additional information associated with the vehicle component.

Other examples of interactive vehicle diagnostic displays are possible as well.

Although a CCS (including its user interface, such as a display) is described primarily herein as an entity separate from a vehicle, it should be noted that, in some embodiments, the CCS could be included as a component of a vehicle, such as the vehicle having the vehicle component or a different vehicle. In such embodiments, a driver of the vehicle, a technician, or the like can view diagnostics for the vehicle component on the vehicle itself or on a different vehicle.

II. Example Systems

FIG. 1 is a diagram showing an example operating environment 1 in which the example embodiments can operate. The operating environment 1 includes a client computing system (CCS) 2, a server computing system (SCS) 4, a communication network 6, a vehicle 8, and communication links 9, 10, 11, 12. The communication network 6 can include the communication links 9, 10, 11, 12 as well as other communication links (not shown). The communication network 6 and the communication links 9, 10, 11, 12 can include various network elements such as switches, modems, gateways, antennas, cables, transmitters, and receivers. The communication network 6 can comprise a wide area network (WAN). The WAN can carry data using packet-switched and/or circuit-switched technologies. The WAN can include an air interface and/or wire to carry the data. Additionally or alternatively, the communication network can comprise a local area network (LAN), private or otherwise.

A CCS, such as CCS 2, can take various forms. For example, a CCS can be a specialty computing system, or "specialty CCS", specifically configured in whole or in part for the purpose of servicing vehicles. A specialty CCS can include unique elements for facilitating servicing of vehicles or can otherwise be uniquely configured in such a way that distinguishes the specialty CCS from another type of computing system. A specialty CCS can be configured to perform various functions associated with servicing vehicles, can include communication interfaces with other systems/servers/networks associated with servicing vehicles, and can be configured to send and receive data over those interfaces in accordance with one or more protocols associated with servicing vehicles. Alternatively, a CCS can be a general purpose, non-specialty computing system, such as a general purpose smart phone, desktop computer, laptop computer, or the like.

As a general matter, a CCS—specialty or general purpose—can take the form of a hand-held device, laptop computer, desktop computer, and/or another type of device.

In line with the discussion above, a SCS, such as SCS 4, can take various forms as well, such as a specialty SCS specifically/uniquely configured for the purpose of servicing vehicles, or a general-purpose SCS.

A vehicle, such as vehicle 8, is a mobile machine that can be used to transport a person, people, and/or cargo. Any vehicle described herein can be driven and/or otherwise guided along a path (e.g., a paved road or otherwise) on land, in water, in the air, and/or outer space. Any vehicle described herein can be wheeled, tracked, railed, and/or skied. Any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine. As an example, a vehicle guided along a path can include a van (such as a dry or refrigerated van), a tank trailer, a platform trailer, or an automobile carrier. Any vehicle described herein can include and/or use any appropriate voltage and/or current source, such as a battery, an alternator, a fuel cell, and the like, providing any appropriate current and/or voltage, such as about 12 volts, about 42 volts, and the like. Any vehicle described herein can include and/or use any desired system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof.

Some vehicles can be identified by characteristics of the vehicle such as when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

A vehicle communication link within a vehicle can include one or more conductors (e.g., copper wire conductors) and/or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle. The CCS, such as a specialty CCS, can include a transceiver connectable to a vehicle communication link and a processor to transmit and receive vehicle communications via the vehicle communication link.

Any vehicle described herein can include an electronic control unit (ECU), a data link connector (DLC), and a vehicle communication link that connects the DLC to the ECU. An ECU can control various aspects of vehicle operation and/or vehicle components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a VDM (such as a VDM based on a received input or a controlled output), and set a diagnostic trouble code (DTC) as being active or history for a detected fault or failure condition within a vehicle.

The DLC can include an on-board diagnostic (OBD) II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Delphi Automotive LLP of Troy, Michigan. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU.

The server 4 can be scaled so as to be able to serve any number of CCSs and/or vehicles, such as one CCS and one vehicle (as shown in FIG. 1), one thousand CCSs and two thousand vehicles, or some other number of clients and vehicles. Furthermore, each CCS can be connected to vehicle 8, and subsequently connected to a different vehicle and/or reconnected to vehicle 8, such that each CCS can communicate with multiple vehicles.

The CCS 2 and/or the vehicle 8 can be located at the same location as one another or remotely from one another at separate, distinct locations. For example, both the CCS 2 and the vehicle 8 can be located at a repair shop. As another example, both the CCS 2 and the vehicle 8 can be located out on the road. As yet another example, the CCS 2 can be located at a repair shop and the vehicle 8 can be located out on the road. One or more of these locations can also include various computerized shop tools (CSTs) and/or non-computerized shop tools, such as a battery charger, torque wrench, brake lathe, fuel pressure gauge, wheel balancer, etc. Further, one or more of the shop tools and/or the CCS 2 can be operable outside of a repair shop. For example, CCS 2 can be operable within the vehicle 8 as the vehicle 8 is driven on roads outside of the repair shop for any of a variety of purposes.

The vehicle 8 can transmit to the CCS 2 various data, such as OBD data (e.g., diagnostic trouble codes (DTCs), measurements read by a shop tool from a VDM, real-time and/or non-real-time electrical measurements (e.g., sensor readings), and/or other types of data. For example, the vehicle 8 can transmit data directly to the CCS 2 over communication link 11. As another example, the vehicle 8 can transmit data indirectly to the CCS 2 by transmitting the data over communication link 12, communication network 6, and communication link 10 to the SCS 4, after which the SCS 4 can transmit the data over communication link 10, communication network 6, and communication link 9 to the CCS 2. The vehicle 8 can perform such an indirect transmission of data with or without specifying the CCS 2 as a destination for the data. For instance, the vehicle 8 (and perhaps other vehicles in communication with the SCS 4) can transmit data to the SCS 4, specifying only the SCS 4 as the destination for the data. Thereafter, CCS 2 can transmit to SCS 4 a request for the data, SCS 4 can assemble the data and transmit the data to the CCS 2 in response to the request.

The CCS 2, the SCS 4, and/or the vehicle 8 can transmit data to (and receive data from) other devices on the communication network 6 as well, such as one or more databases (not shown) to which the CCS 2, the SCS 4, and/or the vehicle 8 have access.

For any given computer device discussed herein, such as the CCS 2, the SCS 4, and/or the vehicle 8, data received by that device can be stored within a computer-readable medium for use by that device. Further, for any given computer device discussed herein, such as the CCS 2, the SCS 4, and/or the vehicle 8, data received by that device can be stored locally in memory at that device and/or can be stored remotely at a storage location accessible by that device (e.g., a remote server or remote database).

One or more CCSs and/or one or more vehicles can be connected by a network established by those devices, such as a vehicle-to-client network, or the like. Such a network can comprise a personal area network (PAN). The PAN can be configured according to any of a variety of standards, protocols, and/or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15,3, 802.15.4, or 802.15.5) for wireless PAN.

In example operating environment 1, there can be a scenario in which the CCS 2 transmits to the SCS 4 a request for a download of information (e.g., information associated with a vehicle component for a particular vehicle). Such a request can include, for example, a YMM of a particular vehicle and a name of a particular vehicle component. As another example, the request can include a YMME of a particular vehicle and an indication (e.g., a description or code) of a particular symptom associated with a particular vehicle component. As yet another example, the request can include data received from the vehicle for which the information is being requested, and such data can include a vehicle identification number (VIN) of the vehicle, a DTC indicative of a particular vehicle component of the vehicle, an image of a particular vehicle component, among other possibilities. In this scenario, upon receipt of the request, the SCS 4 can assemble the download. For instance, upon receipt of the request, the SCS 4 can retrieve some or all of the CCS-requested information from memory at the SCS 4. Additionally or alternatively, upon receipt of the request, the SCS 4 can in turn transmit to one or more databases located remotely from the SCS 4 a request for some or all of the CCS-requested information and then receive some or all of the CCS-requested information from the one or more databases. Upon assembling the download including the CCS-requested information, the SCS 4 can transmit the download to the CCS 2.

Figure 2:
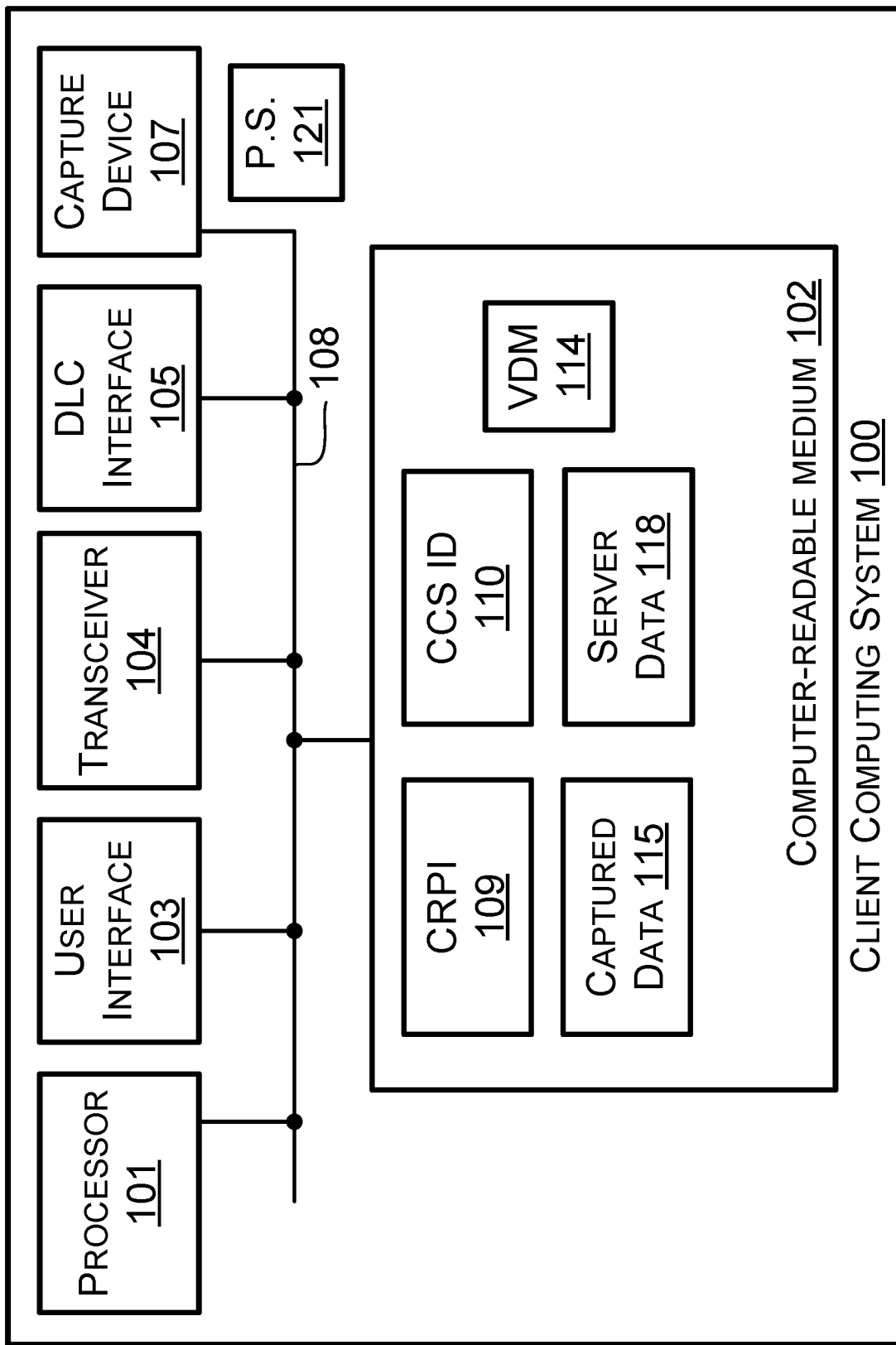
FIG. 2 is a block diagram of an example client computing system.

Next, FIG. 2 is a block diagram of a client computing system (CCS) 100. As shown in FIG. 2, the CCS 100 includes a processor 101, a CRM 102, a user interface 103, a transceiver 104, a DLC interface 105, and a capture device 107. Two or more of those elements can be communicatively coupled and/or linked together via a system bus, network, and/or other connection mechanism 108. Any client described in this description can be configured like the CCS 100 (e.g., include the elements of the CCS 100). Alternatively, a CCS can include the processor 101, the CRM 102, the user interface 103, the transceiver 104, and none of or one or more of the DLC interface 105, and/or the capture device 107. Other example arrangements of a CCS based on the elements shown in FIG. 2 are also possible. The CCS 100 can include the power source 121.

The user interface 103 can include general user interface elements for performing various manual functions such as sending, via the transceiver 104, requests for a download of information, viewing information corresponding to the requested download, entering data (e.g., tool measurements based on a measurement performed by a measurement tool) to be stored in the CRM 102, manipulating data stored in the CRM 102, and deleting data stored in the CRM 102, among other possibilities. Such general user interface elements can take the form of a keyboard, mouse, touchpad, microphone, etc.

The user interface 103 can also include a display for displaying visual content output by the processor 101 and sent by the processor 101 to the user interface 103. The user interface 103 can display content in the form of a display user interface (DUI). A DUI can, for example, include a graphical user interface and/or text-based user interface. Displaying a DUI can include displaying one or more selector fields (e.g., text boxes, drop-down menus, etc.) at which a user can enter a selection, such as a selection of a visual prompt for requesting a download of information from the SCS 4, upon which the CCS 100 can generate the request and transmit the request via the transceiver 104. The user interface 103 can also include an element for providing audio content output by the processor 101 and sent by the processor 101 to the user interface 103.

A DUI can provide a way to request a download of information from the SCS 4. As an example, displaying a DUI can include displaying an Internet browser or other means for requesting a download of information from the SCS 4. Further, once the CCS 100 receives, via the transceiver 104, the download requested from the SCS 4, a DUI can display some or all of the information included in the download and can enable a user of the CCS 100 to interact with the displayed information. As a more particular example, the DUI can display a wiring diagram associated with vehicle 8 so that a technician can (i) view elements of the wiring diagram (e.g., vehicle components such as sensors, circuits, etc. that are part of the wiring diagram), (ii) select an element of interest of the wiring diagram, (iii) view electrical measurements associated with the selected element, (iv) view identifiers of available related information types for the selected element (e.g., component test information, pricing, and test procedure information), (v) select one or more of the identifiers, and/or (vi) view the related information types for the selected identifier(s). As yet another example, if the technician selects content, such as an element of the wiring diagram, for which related information is not available (due to a lack of licensing for the related information or due to the technician's lack of authorization to view the related information), the DUI can display error handling information.

The display can take various forms, such as a touchscreen, computer monitor, television screen, etc., and can utilize a variety of underlying display technologies, such as CRT, LED, LCD, etc.

The transceiver 104 can communicatively couple to a network, such as the communication network 6, a client-to-vehicle network, or a CST-to-client network. That coupling can be carried out, for example, by connecting the transceiver 104 to a wired communication link of the communication network 6, the client-to-vehicle network, or the CST-to-client network, syncing the transceiver to a wireless network access point, placing a phone call, or in some other manner. The transmitter of the transceiver 104 can transmit various data over the communication network 6, the client-to-vehicle network, or the CST-to-client network such as a request to the SCS 4 for a download of information from the SCS 4 or a request to vehicle 8 for real-time electric measurements from vehicle 8.

The transceiver 104 can include one or more items that allow the CCS 100 to receive various information, such as a download of information assembled by the SCS 4, real-time electrical measurements carried out by or otherwise performed by vehicle 8, tool measurement data (i.e., tool measurements) carried out by a computerized measurement tool (CMT), and/or non-measurement data (e.g., captured vehicle identification information) from a CST. The items of the transceiver 104 can include wires, cables, connectors, electrical circuitry, receivers, transmitters, and/or some other item. As an example, the transceiver 104 can include Universal Serial Bus (USB) connectors and cables for connecting to a CMT having a USB connector. Such USB connectors and cables can be configured according to the USB 3.0 standard or another USB standard. As another example, the transceiver 104 can include a radio receiver to receive downloads of information, real-time electrical measurements, tool measurements, and/or non-measurement data transmitted by radio signals from the SCS 4, vehicle 8, a CMT, or a CST. As yet another example, the transceiver 104 can include a modem, a network interface card, and/or a chip mountable on a circuit board. The chip, for example, can comprise a CC3100 Wi-Fi® network processor available from Texas Instruments, Dallas, Texas, a CC256MODx Bluetooth® Host Controller Interface (HCI) module available from Texas instruments, and/or a different chip for communicating via Wi-Fi®, Bluetooth® or another communication protocol. The transceiver 104 can provide the received measurements and/or non-measurement data to another element of the CCS 100 by way of the connection mechanism 108.

The DLC interface 105 can include one or more DLC interface elements that allow the CCS 100 to communicate with a vehicle over a client-to-vehicle network established between the CCS 100 and a DLC of a vehicle. The DLC interface elements include a transceiver (e.g., an integrated transmitter and receiver, or a distinct transmitter and a distinct receiver). The transmitter of the DLC interface 105 can be configured to transmit data to a vehicle. The data transmitted by the DLC interface 105 to the vehicle may include a request for a VDM. The receiver of the DLC interface 105 can be configured to receive data transmitted by the vehicle 8 over the communication link 11. As an example, the transceiver of the DLC interface 105 can comprise a transceiver such as a system basis chip with high speed CAN transceiver 33989 provided by NXP Semiconductors, Eindhoven, Netherlands. The DLC interface elements of the DLC interface 105 can include a DLC that is configured to connect to the DLC in a vehicle, a wire connector, one or more wires that connect the DLC of the DLC interface 105 to the connection mechanism 108 such that vehicle data messages from the vehicle can be received by the processor 101 and/or another element of the CCS 100. The vehicle data messages or some portion thereof can be stored within the VDMs 114.

The capture device 107 is operable to capture various types of data. As an example, the capture device 107 can comprise a camera to capture an image. As another example, the capture device 107 can comprise an optical scanner to capture data by scanning a multi-dimensional code, such as a two-dimensional bar code and/or a matrix code. The captured data can include any of a variety of data that can be interpreted by the processor 101. The interpretation can include performing optical character recognition and/or comparing a captured media file to a reference media file. As an example, the captured data can comprise data representing the VIN of a vehicle. As another example, the captured data can comprise an image of a VIN plate and/or label on a vehicle, an image of a license plate attached to the vehicle, an image of a vehicle or a portion of a vehicle, an image of a vehicle component, and/or a two-dimensional (2D) machine-readable code (e.g., a QR code). The data captured by the capture device 107 can be stored in the CRM as captured data 115. Further, any or all of the data captured by the capture device 107 can be included in a request for a download of information, as discussed above.

The CRM 102 can include CRPI 109, a client (CCS) identifier 110, vehicle data messages 114, captured data 115, and server data 118. The CRM 102 can receive data stored as the VDMs 114, captured data 115, server data 118, or stored as other data from at least one of the processor 101, the user interface 103, and/or the transceiver 104. The CRPI 109 are executable by the processor 101 to perform functions described herein as being performed by the CCS 100.

The client ID 110 can include an identifier that a processor (e.g., a processor of the SCS 4) can use to distinguish the CCS 100 from at least one other client (e.g., all other clients). As an example, the client ID 110 can include a hardware serial number associated with the CCS 100. As another example, the client ID 110 can include a license number, such as a license number associated with an information product, such as the SHOPKEY® information system available from Snap-on Incorporated, Kenosha, Wisconsin. Additionally or alternatively, the client ID 110 can include an identifier that a processor can use to determine a model type of the CCS 100. For example, the client ID 110 can include a model identifier such as "EEMS330 W" which represents a model type of a client referred to as the VERUS® Edge diagnostic and information system sold by Snap-on Incorporated. The client ID 110 can include a software level identifier associated with software (e.g., the CRPI 109) contained in the CRM 102 and a hardware level identifier associated with items contained within the CCS 100. In line with the discussion above, the request for the download described herein can include the client ID 110 such that the SCS 4 can determine which client to send the download.

Furthermore, the client ID 110 can be associated with or include a labor rate. The labor rate, or the client ID 110 for that matter, can be pre-stored in the CRM 102 or can be input manually by a user of the CCS 100 via the user interface 103. The labor rate can enable the CCS 100 to receive or determine a cost estimate for servicing a particular vehicle component. For example, the SCS 4 can receive the client ID 110 and labor rate from the CCS 100 with the request for the download, can determine a cost estimate for servicing a particular vehicle component based on the labor rate, and can include the determined cost estimate in the download sent to the CCS 100. Alternatively, the SCS 4 can determine an estimated amount of time for servicing the particular vehicle component, and then include the estimated amount of time in the download sent to the CCS 100. Thereafter, the CCS 100 can determine the cost estimate by multiplying the estimated amount of time by the labor rate. This can reduce the burden on the SCS 4 and can possibly eliminate the need to include the labor rate in the request.

The server data 118 can include data the CCS 100 requests from the SCS 4 and received at the transceiver 104 from the SCS 4. For example, the received data can be and/or include the download described herein—namely, the download requested by the CCS 100, prepared by the SCS 4, sent by the SCS 4 to the CCS 100, and received by the CCS 100. Additionally or alternatively, as another example, the received data can include a hyperlink to another download. Other examples are also possible.

In general, the CRPI 109 can include program instructions executable by the processor 101 to cause the CCS 100 to perform any function described herein as being performed by the CCS 100 (e.g., function sets 230 and 390) and/or to cause any item of the CCS 100 to perform any function herein as being performed by that item of the CCS 100. Some particular examples of the CRPI 109 are provided in the following three paragraphs.

The CRPI 109 can include program instructions to cause the processor 101 to receive and process user-input representing a request for a download of information associated with at least one vehicle component. Further, the CRPI 109 can include program instructions to cause the processor 101 to, in response to receiving and processing the user-input representing the request, generate the request for the download of information associated with at least one vehicle component, the request being in a form to be transmitted via transceiver 104. In addition, the CRPI 109 can include program instructions to cause the transceiver 104 to transmit the request via the communication network 6 to the SCS 4, and then cause the transceiver 104 (and thereafter perhaps the processor 101) to receive the download, the download including, for instance (i) an image representative of a vehicle component (e.g., an image of a wiring harness), (ii) symbol data associated with a first symbol, (iii) a set of one or more selectable identifiers, and (iv) supplemental information associated with the vehicle component, where each selectable identifier of the set can indicate a respective portion of the supplemental information associated with the vehicle component.

The CRPI 109 can include program instructions to cause the user interface 103 to display a DUI, such as any DUI described in this description. In particular, the CRPI 109 can include program instructions to cause the user interface 103 to, after the CCS 100 receives a download (such as any download described in this description), display the image and the first symbol, without displaying the set of selectable identifiers and the supplemental information. The CRPI 109 can include program instructions to cause the processor 101 to, while the user interface 103 is being caused to displaying the image and the first symbol, receive and process user-input corresponding to user selection of the first symbol. Further, the CRPI 109 can include program instructions to cause the user interface 103 to, in response to the processor 101 receiving and processing the user-input, display the set of selectable identifiers. Still further, the CRPI 109 can include program instructions to cause the processor 101 to, while displaying the set of selectable identifiers, receive and process another user-input corresponding to user selection of one of the selectable identifiers. Yet still further, the CRPI 109 can include program instructions to cause the user interface 103 to, in response to the processor 101 receiving and processing the other user-input, display the portion of supplemental information indicated by the selected identifier.

The CRPI 109 can include program instructions to cause the processor 101 to receive and process other user-inputs as well.

III. Example Operation

Next, FIG. 3 shows a flowchart depicting a set of functions 230 (or more simply "the set 230") that can be carried out in accordance with the example embodiments described in this description. The set 230 includes the functions shown in blocks labeled with whole numbers 231 through 236 inclusive. The following description of the set 230 includes references to elements shown in other figures described in this description, but the functions of the set 230 are not limited to being carried out only by the referenced elements. A variety of methods can be performed using all of the functions shown in the set 230 or any proper subset of the functions shown in the set 230. Any of those methods can be performed with other functions such as one or more of the other functions described in this description. One or more of the functions shown in the set 230 can be carried out multiple times in performing a method in accordance with the example embodiments. Further, the processor 101 of the CCS 100 can execute the CRPI 109 discussed above to cause some or all of the set 230 to be performed.

Block 231 includes receiving a download including (i) an image representative of a vehicle component, (ii) symbol data associated with a first symbol, (iii) a set of selectable identifiers, the set including one or more selectable identifiers, and (iv) supplemental information associated with the vehicle component. Each selectable identifier of the set can indicate a respective portion of the supplemental information associated with the vehicle component and, when selected, causes the display to display the respective portion of the supplemental information. Some supplemental information within a download can be associated with multiple selectable identifiers within the download.

One or more of the CCS's described herein (e.g., CCS 100 or CCS 2) can be configured to receive the download. In particular, one or more of the elements of the CCS can be configured to receive the download, such as one or more processors connected to a display (e.g., the processor 101 of CCS 100, connected to user interface 103).

In some scenarios, CCS 100 (or CCS 2) can generate and transmit to a server (e.g., the SCS 4) the request for the download in response to first receiving user-input representing the request. To facilitate this in practice, the CCS 100 can provide an application or other mechanism through which a user (e.g., technician) can enter a request for information regarding a particular vehicle component for a particular vehicle. Further, such a request can include a variety of information representing characteristics of the particular vehicle and/or the particular vehicle component. Accordingly, the server can then use such information to assemble the download for the CCS 100 and transmit the download to the CCS 100. Examples of such information includes: (i) an identifier of the CCS 100 (e.g., client ID 110) (so that the server can determine where to send the download), (ii) an identifier of a particular vehicle (e.g., a VIN, a YMM, a YMME, etc.) (iii) an identifier of a particular vehicle component for which the download is being requested, (iv) the captured data 115 captured by the capture device 107 as discussed above (e.g., an image of a particular vehicle component for which the download is being requested, a bar code or QR code indicating the vehicle's VIN), and/or (v)

one or more symptoms that a particular vehicle and/or a particular vehicle component is experiencing, among other possible information.

The CCS 100 can receive the information discussed in the preceding paragraph in various ways. For example, the CCS 100 can cause the user interface 103 to display a drop down menu to select the YMM or YMME of the vehicle. In particular, the drop down menu can enable a user to first select a year from a list of years, then select a manufacturer from a list of manufacturers for the selected year, and then select a model from a list of models for the selected manufacturer and year. The menu can further enable the user to then select an engine type for the selected YMM. As another example, the CCS 100 can obtain at least a portion of the information, such as the YMME, from the vehicle itself via the client-to-vehicle network.

After CCS 100 receives the information discussed in the preceding paragraph, the processor 101 can interpret the information to determine which characteristic(s) of the particular vehicle and/or the particular vehicle component to include in the request for the download. The processor 101 can then generate the request for the download and transmit the request via transceiver 104 to the server. Upon receipt of the request, the server can read the request to determine the characteristic(s) and assemble the download to include the image, symbol data, set of selectable identifiers, and supplemental information for the vehicle component indicated by the characteristic(s). The server can assemble the download by retrieving some or all of the download from memory at the server and/or transmitting to one or more databases located remotely from the server a request for some or all of the download and then receiving some or all of the download from the one or more databases. Upon assembling the download, the server can transmit the download for receipt by the CCS 100.

It can be assumed in some scenarios that the CCS 100 receives the download after and/or responsive to a technician first selected a particular vehicle YMM or YMME, although it should be understood that in other scenarios a technician can select a particular vehicle YMME at some point after the CCS 100 receives the download.

The vehicle component can be any of a variety of vehicle components on/in a vehicle. As an example, the vehicle component can include a brake rotor, a brake drum, a crankshaft, a camshaft, an ECU, a fuel pump, a solenoid, or a sensor. As another example, the vehicle component can comprise any of a variety of vehicle subsystems, such as a vehicle steering system, a vehicle fuel system, a vehicle emissions system, or a vehicle braking system. As another example, the vehicle component can be a wiring harness or an aspect of a wiring harness, such as a connector terminal, a circuit, a wire, etc. A "circuit", as described herein, can refer to any wire or wires that are connected between two or more nodes and that serve as a means for carrying an electrical or optical signal. Further, a "wire" can refer herein to any type of wire, such as copper, aluminum, fiber-optic, etc., that can carry an electrical or optical signal.

Other examples of the vehicle component are also possible. The vehicle component can be a single vehicle component that does not contain any further vehicle components, such as a manifold air pressure (MAP) sensor or an ambient air temperature sensor. However, in some scenarios, the vehicle component can be a vehicle component that includes multiple other vehicle components, such as a wiring harness consisting of multiple aspects of a wiring harness (e.g., individual circuits, connector terminals, and/or sensors). In such scenarios, the CCS 100 receiving the download can include receiving a download that includes images, symbol data, sets of selectable identifiers, and supplemental information corresponding to the vehicle component as well as other vehicle components that are part of the vehicle component.

The downloaded image can have various formats. For instance, the image can be a scalable vector graphics (SVG) image or a JPEG image. Other examples are possible as well.

Receipt of user-input can be one way of triggering the processor 101 to generate and transmit a request for the download, although other ways are possible as well. In one example, for instance, the processor 101 can generate and transmit the request automatically without direct user-input, such as in response to a particular triggering event. In another example, the processor 101 can receive a VDM that indicates a problem with a particular vehicle component (e.g., a DTC within a VDM, where the DTC indicated that the particular vehicle component is failing).

The image included in the download can include the image of the vehicle component or provide data representing the image of the vehicle component for causing the user interface 103 to display the image. The processor 101 can process such data and in turn responsively cause user interface 103 to provide the image as part of a DUI. The image can be a two-dimensional (2D) and/or three-dimensional (3D) image of the vehicle component, or another type of image.

The first symbol (and any other "symbols" described herein) can take the form of a "hotspot" of the displayed image of the vehicle component. Herein, a "hotspot" can generally refer to a portion of the displayed image (or a portion of the DUI in general) that a user of the CCS 100 can interact with via the user interface 103. For example, when the processor 101 detects that a user is hovering over a hotspot with a mouse cursor or other aspect of the user interface 103, or the cursor is proximate to the hotspot in a region within a predetermined threshold distance from the hotspot, the processor 101 can responsively cause an event to occur, such as enabling the hotspot to be selected by the user and/or displaying a pop-up menu or other type of window (e.g., a menu or window including the set of identifiers or other information associated with the vehicle component). As another example, the processor 101 can detect a click, double-click, touch tap, or double-touch tap of the hotspot itself (or somewhere in the region) and can responsively cause an event to occur. These interactions with a hotspot (e.g., hovering over, proximate to, clicking, tapping, etc.) can be referred to as a selection of the hotspot (or a type of "hotspot-selection"), so as to trigger the processor 101 to cause an event to occur. Other DUI elements discussed herein can take the form of a hotspot as well.

Example events that can occur as a result of selecting a hotspot can vary. Further, hotspot selection can take various forms. As an example, when the processor 101 detects that a user is hovering over a hotspot, but has not clicked the hotspot, the processor 101 can responsively cause a pop-up window of information related to the hotspot to appear as long as the user's cursor remains hovering over the hotpot. Once the processor 101 detects that the user's cursor is no longer hovering over the hotspot, the processor 101 can responsively cause the pop-up window of information related to the hotspot to disappear. By contrast, when the processor 101 detects that the user has clicked the hotspot, the processor 101 can responsively cause the pop-up window of information to appear to a more permanent degree such that even when the user moves their cursor away from the hotspot (or the window itself), the pop-up window of information will remain displayed.

The symbol data can include the first symbol or provide data representing the first symbol for causing the processor 101 to establish the first symbol (e.g., determine where the user interface 103 should display the first symbol and/or cause the user interface 103 to display the first symbol). For instance, the symbol data can include a default set of coordinate points with respect to a default size of the image, the set of coordinate points including at least one coordinate point that corresponds to a coordinate point of a grid defined for the display (e.g., a predetermined grid of pixels). The set of coordinate points can include, for example, a set of pixel column(s) and row(s) at which to display the symbol. In some embodiments, the set of coordinate points can additionally include a set of pixel coordinate points identifying the region within the predetermined threshold distance from the first symbol, so that the processor 101 can recognize when a mouse cursor or other selection means enters the region and responsively trigger an event to occur. In any case, the processor 101 can use the default set of coordinate points, the grid defined for the display, and perhaps additionally a zoom level of the image with respect to the default size of the image, to establish the first symbol. The processor 101 can establish other symbols as well using the same type of data associated with each other symbol.

In addition to appearing in a pre-specified area of the image as noted above, a hotspot can serve as a link (e.g., a URL) to a particular search query associated with the hotspot such that, when the hotspot is clicked or otherwise selected, the processor 101 can responsively take action to initiate the particular search query. For instance, if the hotspot is placed in the area of the image associated with a MAP sensor, a selection of the hotspot can trigger the processor 101 to initiate a query for information associated with the MAP sensor that may or may not be included in the download described above.

In practice, after the image and symbol(s) are initially displayed, a zoom level of the image can affect where within the display the symbol(s) appear. For instance, when a user zooms in or out with respect to a displayed image and symbol, the number of pixels surrounding the symbol can change. And in another instance, when multiple symbols are displayed, zooming in or out can cause one or more of such symbols to disappear from view in the DUI, and/or can cause one symbol to appear in the same area of the display where another symbol once appeared. As such, the processor 101 can keep track of the zoom level and dynamically adjust the location(s) within the display where the symbol(s) should appear and cause the user interface 103 to display the symbol(s) in those dynamically-adjusted locations.

As noted above, the vehicle component itself can be a wiring harness, and thus the image in the download can depict the wiring harness. In an example scenario, however, the vehicle component can be connectable to or include a wiring harness, such as a MAP sensor connectable to the wiring harness or a single circuit of the wiring harness, and thus the image in the download can depict the wiring harness as connected to or part of the vehicle component. In line with this example scenario, the first symbol can be a symbol for a first circuit within the wiring harness, for instance. When a wiring harness includes other circuits, sensors, etc., the download could include other symbols (and corresponding symbol data) for such other circuits, sensors, etc., within the wiring harness.

The supplemental information can include various types of information associated with the vehicle component, examples of which include (i) a component test information, (ii) a real-fix information, (iii) a removal and replacement information, (iv) a connector view information, (v) a component location information, (vi) a technical service bulletin (TSB) information, (vii) a top diagnostic trouble code information, (viii) a top symptom information, (ix) a parameter identifier (PID) value information, (x) a baseline data information, (xi) a vehicle component calibration information, and (xii) a vehicle component reset information.

The component test information can include, for instance, information indicating how to test the vehicle component to determine whether the vehicle component has failed, such as a diagnostic flowchart and troubleshooting hints to determine whether the vehicle component is operating properly or failed.

The real-fix information can include, for instance, information the SCS 4 determines or has access to based on prior successful fixes to similar vehicles having the same displayed vehicle component. This information can be determined from repair orders describing the prior successful fixes. Further, the real-fix information can be indicative of a count of how many prior fixes were successful using the applied fix.

The removal and replacement information can include, for instance, information explaining how to remove the vehicle component from the vehicle and how to replace and/or reinstall the vehicle component into the vehicle. This information can identify special hand tools required for the removal and replacement procedure, torque specifications, vehicle component location information, and the like.

The connector view information can include, for instance, information indicating where a connector is located in a vehicle, circuit identifier (e.g. circuit number and/or name), pinout (description showing each pin/terminal in the connector and what circuit is connected to each pin).

The component location information can include, for instance, a description textual and/or graphical showing location of the vehicle component, perhaps in relation to one or more other vehicle components.

The TSB information can include, for instance, information obtained from TSB (e.g., a vehicle manufacturer TSB), such as information that indicates known faults, recall information, test procedures, removal and replacement procedures, etc.

The top diagnostic trouble code information can include, for instance, information that lists the DTC associated with the vehicle components. When multiple DTC associated with the vehicle component, the DTC can be ranked from most-likely to least likely to be set. Other rankings are possible as well.

The top symptom information can include, for instance, information that list the most-likely symptoms related to the vehicle component. This information can be theoretical and/or based on prior repair order information listing symptoms or live data.

The PID value information can include, for instance, information indicating specified values of parameters associated with a vehicle component (e.g., sensor values).

The baseline data information can include, for instance, electrical measurements of the vehicle component including a baseline value, such as the baseline voltage waveform discussed below.

Other types of supplemental information are possible as well. For instance, the supplemental information can include specification information—namely, specifications for the vehicle or the vehicle component. As an example, given a vehicle component that includes bolt holes or bolts for a thermostat housing or a cylinder head (which would be shown in the displayed image), the specification information may indicate a torque specification for tightening a bolt at the bolt hole. As another example, the vehicle component can include (and the displayed image can show) a fluid fill location, and the specification information can list a fluid type and capacity information for the fluid associated with the vehicle component. As yet another example, the supplemental information can include functional test information. The functional test information can include information related to testing that controls the vehicle component by serial data sent to the ECU of the vehicle. As yet another example, the supplemental information can include a PID list related to the vehicle component.

As still yet another example, the supplemental information can include a vehicle component calibration information to be performed on a vehicle if a procedure is performed to a particular vehicle component. For instance, the vehicle component calibration information can include calibration information for calibrating a lane departure system component if a wheel alignment (e.g., front and/or rear wheel alignment) procedure is performed, or the vehicle component calibration information can include calibration information for calibrating a parking assist component in a vehicle if a procedure is performed to a bumper on the vehicle. As still yet another example, the supplemental information can include a vehicle component reset information to be performed on a vehicle if a procedure is performed to a particular vehicle component. For instance, the vehicle component reset information can include reset information regarding resetting an electronic parking brake on a vehicle if a battery in the vehicle is disconnected from a battery cable in the vehicle.

As noted in block 231, each selectable identifier can identify one of the types of supplemental information listed in the preceding paragraph. For example, the set of selectable identifiers can include icons and/or text that read "Component Test" and "R&R Procedure", corresponding to the component test information and to the removal and replacement information, respectively. Further, the processor 101 can cause the user interface 103 to provide a DUI including the set of selectable identifiers. Upon receipt of a user-input representing a selection of one of the selectable identifiers, the processor 101 can responsively cause the user interface 103 to provide a DUI (e.g., as a new DUI or as part of the current DUI) including the supplemental information corresponding to the selected identifier. As an example, upon receipt of a user-input representing a selection of "Component Test", the user interface 103 can responsively display the component test information from the download. As another example, upon receipt of a user-input representing a selection of "R&R Procedure", the user interface 103 can responsively display the removal and replacement information from the download. In some embodiments, the user interface 103 can display each selectable identifier as a respective hotspot.

Figure 4:
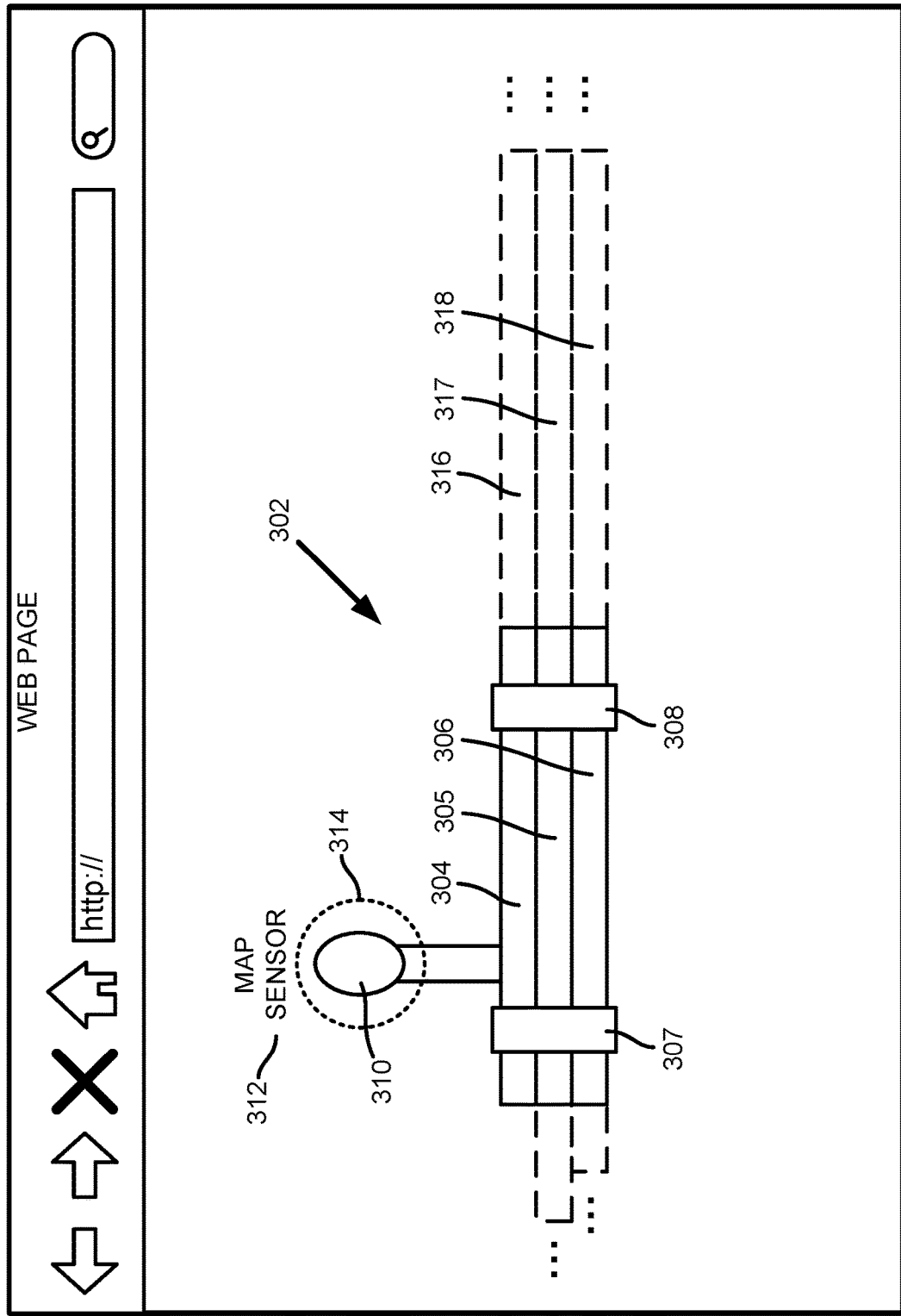
FIG. 4 shows an example display user interface.

Next, block 232 includes displaying, on the display after receiving the download, the image and the first symbol without displaying the set of selectable identifiers. Displaying the image and the first symbol can include the user interface 103 displaying an image that shows a portion of the vehicle component or all of the vehicle component. For example, the displayed image can depict (or show) an entire wiring harness, including all connected sensors and/or circuits, or can instead include a portion of the wiring harness, including only some connected sensors and/or circuits (e.g., as shown in FIG. 4). Further, displaying the image and the first symbol can include the user interface 103 first displaying the image and then displaying the first symbol at some point after the image is displayed. Alternatively, displaying the image and the first symbol can include the user interface 103 displaying the image and the first symbol at substantially the same time. In either case, the user interface 103 can, for example, display the image and then display the first symbol superimposed over the image, or can display the first symbol such that it is incorporated as part of the image. If the download includes other symbols associated with the vehicle component, the user interface 103 can display those symbols as well without displaying the set of selectable identifiers.

The user interface 103 can display the image and the first symbol (and perhaps other symbols) such that a user can view the image and symbol(s) in various ways. For example, the image can take the form of a 2D or 3D image and the user interface 103 can enable a user to pan, zoom (in or out), and/or rotate the image to observe different portions of the image.

Next, block 233 includes receiving, while the image and the first symbol are displayed on the display without the set of selectable identifiers, a first input corresponding to selection of the first symbol. Receiving the first input can include the processor 101 receiving, via user interface 103, a first user-input representing a selection of the first symbol. Such a selection of the first symbol can take the form of one of the hotspot-selection types discussed above (e.g., hovering over the first symbol, bringing a mouse cursor within a predetermined threshold distance from the first symbol, or clicking/double-clicking the first symbol).

Next, block 234 includes displaying, on the display in response to receiving the first input, the set of selectable identifiers. Displaying the set of selectable identifiers can include displaying one selectable identifier, or can include displaying more than one selectable identifier, depending on how many selectable identifiers are included in the download.

In some embodiments, displaying the set of selectable identifiers can include the user interface 103 displaying the set of selectable identifiers such that they overlay the image, the first symbol, and/or another area of the DUI. For example, as shown in FIG. 4, the set of selectable identifiers can be displayed as a pop-up list proximate to the first symbol and overlaying a portion of the image. The set of selectable identifiers can be displayed in other forms as well. For example, the user interface 103 can display the set of selectable identifiers as part of a drop-down menu appearing in menu bar of an Internet browser.

Next, block 235 includes receiving, while the set of selectable identifiers is displayed, a second input corresponding to selection of a first selectable identifier from the displayed set of selectable identifiers. Receiving the second input can include the processor 101 receiving, via user interface 103, a second user-input representing a selection of the first selectable identifier (e.g., clicking, tapping, hovering over, etc. the first selectable identifier).

Next, block 236 includes displaying, on the display in response to receiving the second input, the respective portion of the supplemental information indicated by the first selectable identifier. For example, in line with the discussion above, if the first selectable identifier is the "Component Test" identifier, and processor 101 receives the second input corresponding to a selection of the "Component Test", displaying the respective portion of the supplemental information indicated by the first selectable identifier can include the user interface 103, in response to the processor 101 receiving the second input, displaying the component test information that was included in the download. As another example, if the first selectable identifier is the "Related TSB's" identifier, and processor 101 receives the second input corresponding to a selection of the "Related TSB's", displaying the respective portion of the supplemental information indicated by the first selectable identifier can include the user interface 103, in response to the processor 101 receiving the second input, displaying the technical service bulletin (TSB) information that was included in the download.

Additional functions are described below. Some or all of these functions can be carried out before, during, or after the set 230 described above.

After displaying the respective portion of the supplemental information indicated by the first selectable identifier, the processor 101 can receive, while the set of selectable identifiers is displayed, a third input corresponding to selection of a second selectable identifier from the displayed set of selectable identifiers, and can responsively cause the user interface 103 to display the respective portion of the supplemental information indicated by the second selectable identifier. The user interface 103 displaying the respective portion of the supplemental information indicated by the second selectable identifier can include displaying the respective portion of the supplemental information indicated by the second selectable identifier with or instead of the respective portion of the supplemental information indicated by the first selectable identifier. As an example, if "Component Test" was selected and the component test information is being displayed, and then the technician selects "Related TSB's", the processor 101 can cause the user interface 103 to no longer display the component test information and then instead display the technical service bulletin (TSB) information in the same location in the DUI where the component test information was displayed or in a different location in the DUI. As another example, in a similar situation, processor 101 can alternatively cause the user interface 103 to display both the component test information and the technical service bulletin (TSB) information at the same time so that the technician can view both simultaneously. Similar functions can be performed in the event that fourth, fifth, etc. inputs are received corresponding to selection of third, fourth, etc. selectable identifiers.

In some scenarios, the download can also include service estimate information associated with the vehicle component. The service estimate information can include various information that can enable a technician or other user to determine how much time, money, and/or labor may be needed for servicing the vehicle component associated with the selected identifier. As such, the service estimate information can include cost information indicating a price of the vehicle component and/or labor information pertaining to servicing of the vehicle component.

The service estimate information can take the form of service estimate information for only one vehicle component or only one aspect of the vehicle component. For example, when the vehicle component is a fuel pump, the service estimate information can include a price and labor hours for the fuel pump. Additionally or alternatively, the service estimate information can take the form of a collection of service estimate information for each aspect of the vehicle component. For example, when the vehicle component is a wiring harness, the service estimate information can include a price and labor hours for each of one or more aspects of the wiring harness, such as a sensor, individual circuit, etc. As a more particular example, as shown in FIG. 4, a MAP sensor can have a price of $47.95 and labor for servicing the MAP sensor can take approximately 3.2 hours.

Accordingly, the functions discussed above can further include the user interface 103 displaying, on the display, while displaying the set of selectable identifiers, the service estimate information for the vehicle component displayed on the DUI and at least one selection graphic associated with the service estimate information. Displaying the selection graphic(s) can include the user interface 103 displaying at least one check box, radio button, etc. within the DUI. At some point after the user interface 103 displays the service estimate information and the selection graphic(s), the processor 101 can receive an input corresponding to selection of the selection graphic(s). For example, such an input can take the form of a user checking a check box displayed proximate to the service estimate information.

In some scenarios, a technician can use the functions described herein as part of a "session" (i.e., a period of time) during which the technician views and interacts with the interactive vehicle diagnostic display. As part of this session, the CCS 100 (e.g., the processor 101), the SCS 4, or another device can maintain, in local or remote memory, various records of the technician's interactions with various vehicle components. For example, the records can include a history of the vehicle components for which the technician requested downloads, a history of the supplemental information the technician viewed, etc.

As another example, the records can include an ongoing service estimate for the technician, including running totals for service estimate information for one or more vehicle components. As such, when a technician wishes to add the price and/or labor time for a particular vehicle component to the service estimate, the technician can input via the user interface 103 a selection of the selection graphic(s) corresponding to price and/or labor, upon which the processor 101 can then responsively output a request to generate a new service estimate or update an existing service estimate based on the service estimate information. Outputting the request to generate or update the service estimate can include the processor 101 causing the transceiver 104 to transmit the request to the SCS 4 or other device that is maintaining the service estimate, after which the SCS 4 or other device can receive the request and responsively generate a new service estimate or update the existing service estimate. Alternatively, when the service estimate can be maintained locally at the CCS 100, outputting the request to generate or update the service estimate can include the processor 101 causing a new service estimate to be generated and stored in memory or causing the existing service estimate to be updated in memory.

An interactive vehicle diagnostic display can include at least one electrical measurement associated with the vehicle component displayed on the DUI. For example, when the vehicle component is or includes a wiring harness which in turn includes various circuits and/or sensors, the download can include respective electrical measurements corresponding to each circuit and/or sensor obtained over a period of time. The electrical measurement(s) can be real-time electrical measurement(s) or non-real-time electrical measurement(s) obtained by the CCS 100, by a CMT, and/or by other means, from the vehicle having the vehicle component (e.g., from the vehicle having the technician-selected YMME). For instance, the electrical measurement(s) can be electrical measurement(s) that the SCS 4 received from the vehicle having the technician-selected YMME, such as electrical measurements that the vehicle reported directly to the SCS 4 or to another device that in turn transmitted to the SCS 4.

The electrical measurement(s) can take various forms. For instance, for a given vehicle component or a given aspect of a given vehicle component, the electrical measurement(s) can take the form of at least one voltage waveform representing multiple electrical measurements obtained over a period of time for the given vehicle component or the given aspect, such as a 2D voltage waveform plot of an oscilloscope reading. A voltage waveform can include, for instance, a baseline voltage waveform representing multiple electrical measurements, or a voltage waveform representing multiple electrical measurements obtained from the vehicle. Further, the electrical measurement(s) can include a minimum expected value of the electrical measurement(s) and/or a maximum expected value of the electrical measurement(s). The CCS 100 can display the electrical measurement(s) in any one or more of the forms discussed herein, including those discussed in this paragraph.

In an example scenario where the vehicle component is a wiring harness, a technician can select, via the user interface 103, the first symbol, where the first symbol can correspond to a first circuit of a wiring harness depicted as the displayed image. In response to receiving the selection, the user interface 103 can display within a DUI—in the same pop-up menu as the list of selectable identifiers or in a separate window—multiple electrical measurements obtained from the vehicle for the first circuit over a period of time. For example, the user interface 103 can display the multiple electrical measurements as a voltage waveform, as discussed above. As another example, the user interface 103 can display in a single graph a minimum expected value and a maximum expected value for the multiple electrical measurements, such as a minimum expected voltage and a maximum expected voltage. As yet another example, the user interface 103 can display the multiple electrical measurements in multiple separate graphs.

The download can include the electrical measurement(s), as part of the supplemental information or as additional information. Alternatively, the CCS 100 can obtain the electrical measurement(s) by way of a separate process occurring simultaneous to receiving the download or after receiving the download (e.g., after the user selects the first symbol associated with the vehicle component). As an example of how the CCS 100 might obtain desired electrical measurement(s) for the vehicle component, the CCS 100 (e.g., a vehicle interface device of the CCS 100, such as the DLC interface 105) can transmit to the vehicle over the client-to-vehicle network a request for a live data value associated with a PID used by the vehicle component, such as a PID associated with an electrical signal carrier on a circuit of a wiring harness. The vehicle interface device of the CCS 100 can then at some point receive, from the vehicle (e.g., from an electronic control unit within the vehicle), via the transceiver 104, the requested data value associated with the PID. The processor 101 can then convert the data value to obtain the desired electrical measurement(s).

In practice, if a user is not licensed or otherwise authorized to view any of the information associated with the vehicle component, the DUI may not include the restricted information. The restricted information can be included as part of the download in some scenarios, but not displayed. In other scenarios, the SCS 4 can determine that the user of the CCS (or the CCS itself, based on an identifier of the CCS included in the request) is not authorized to view certain information that is being requested, and in response to determining this, may not include the restricted information when assembling the download. Other examples of managing restricted information are possible as well.

IV. Example Display User Interface (DUI)

Figure 5:
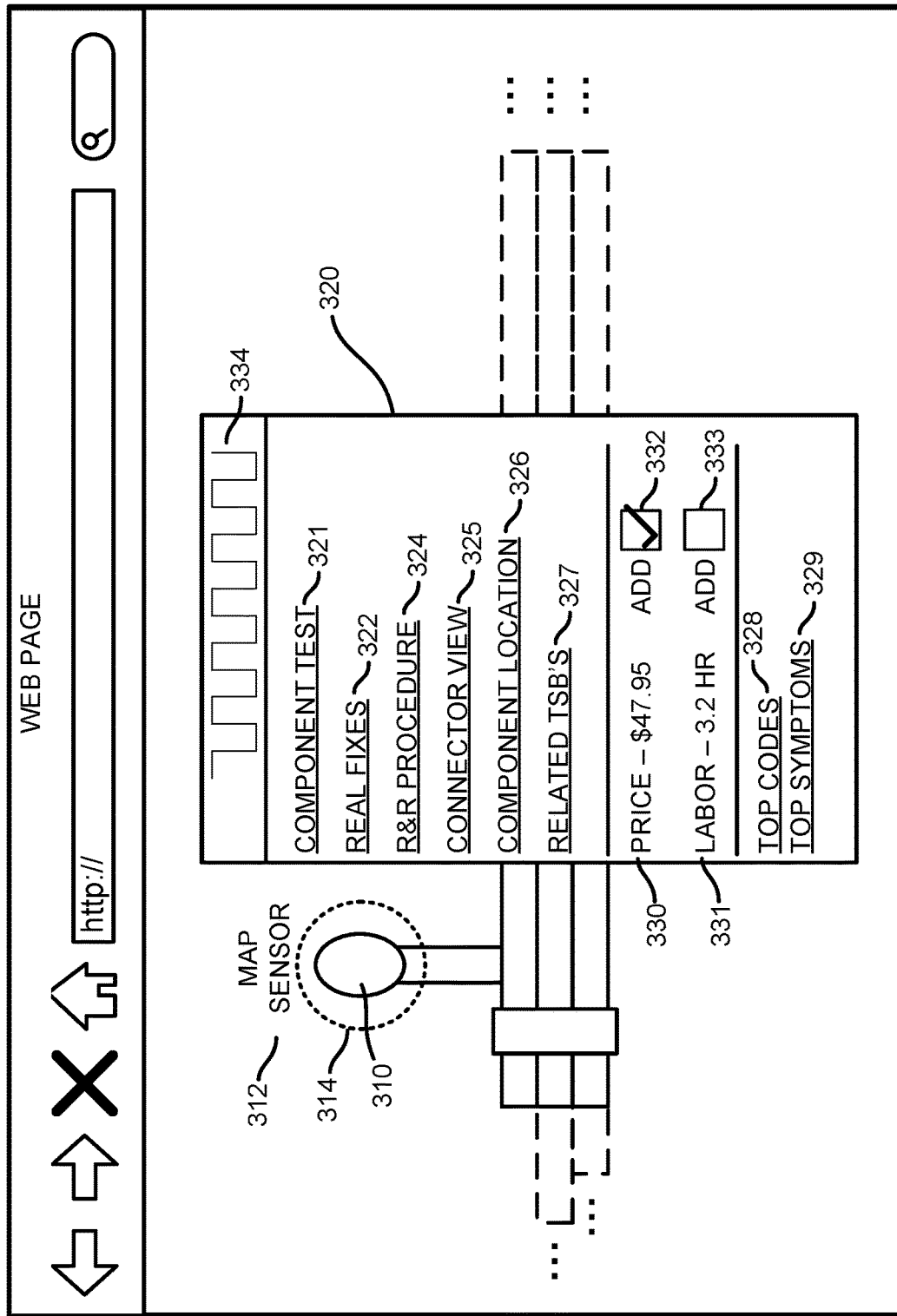
FIG. 5 shows an example display user interface.
Figure 6:
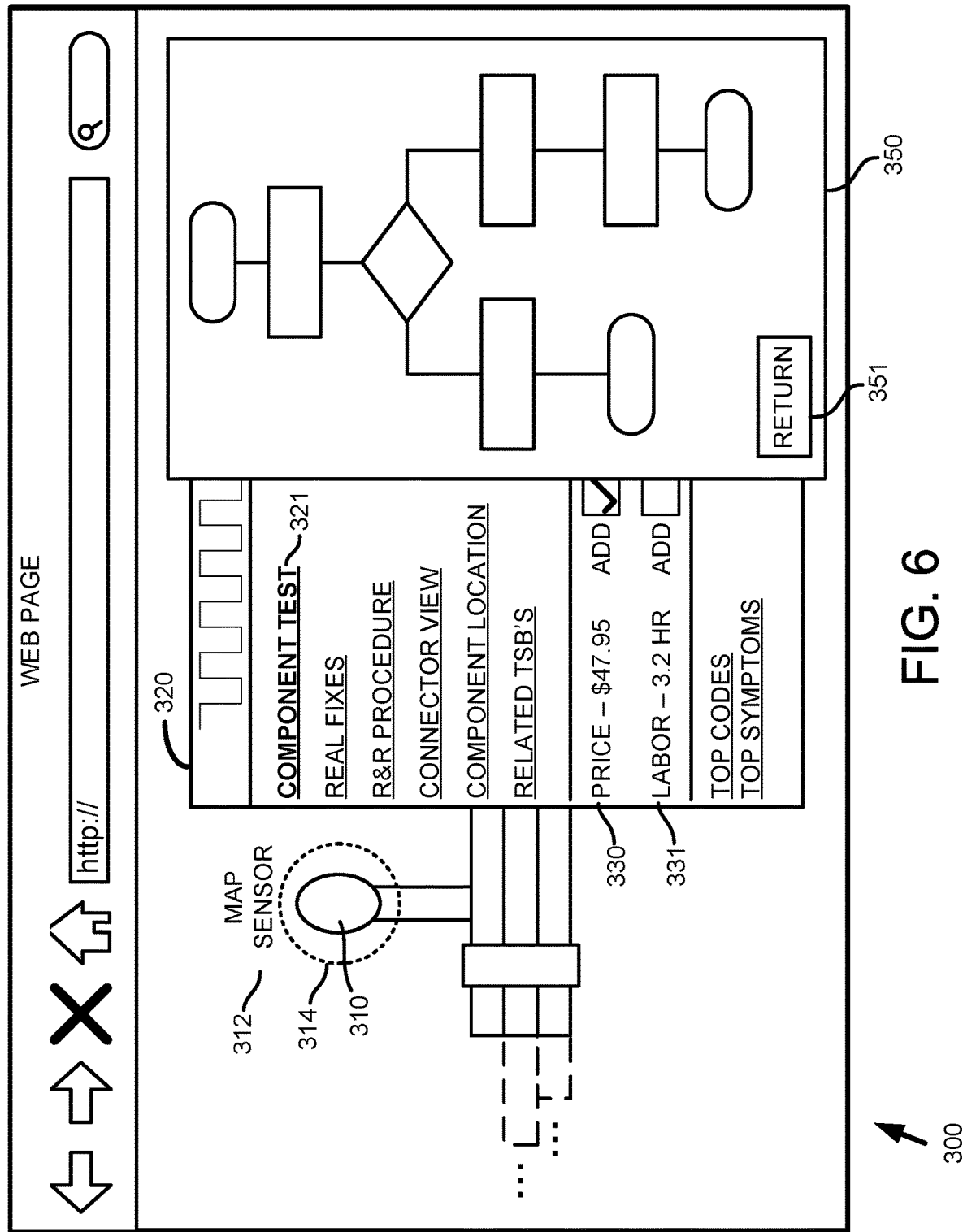
FIG. 6 shows an example display user interface.

FIG. 4, FIG. 5, and FIG. 6 show an example CCS-provided DUI 300 at three different points in time during a session for an interactive vehicle diagnostic display. In particular, the DUI 300 shows that the interactive vehicle diagnostic display is in the form of a web page in an Internet browser. The CCS that provides the DUI 300 can be any client configured like the CCS 2 or the CCS 100, and can provide the DUI 300 by way of a user interface configured like the user interface 103 of CCS 100. The DUI 300 includes an image representing a portion of a wiring harness for a vehicle having a particular YMME. Although the DUI 300 does not show the YMME associated with the vehicle component, in some scenarios the YMME can be displayed as part of the DUI 300. Other examples of ways in which a DUI can represent an interactive vehicle diagnostic display are also possible. Other examples of vehicle components that can be displayed are also possible.

FIG. 4 shows the DUI 300 including an image of a wiring harness 302. The DUI 300 can be displayed after various other events have occurred. For example, after selections of a vehicle YMME and after a download has been received for the wiring harness 302, such as a download taking the form described above. Displayed as part of the image 302 are the following: a first circuit 304, a second circuit 305, a third circuit 306, two connectors 307, 308 holding the three circuits together, a MAP sensor 310 connected to the wiring harness, a text label 312 for the MAP sensor 310, and a symbol 314 ("hotspot") representative of the MAP sensor 310.

Also shown are portions of the three circuits that may not be initially displayed as part of the image 302. These portions are shown as dashed lines and represented by reference numbers 316, 317, and 318, corresponding to the first circuit 304, the second circuit 305, and the third circuit 306, respectively. In practice, the download that the CCS receives can include image data representative of a full image of the wiring harness, but the CCS may not display the entire image at once. Rather, the CCS can display only a portion of the image, but the DUI 300 can enable a user to navigate to other portions of the image. For example, in order to view portions 316, 317, and 318, the CCS can provide as part of the DUI 300 one or more user-selectable navigation tools, such as navigation arrows that, when selected, cause a different portion of the image to be displayed. Other examples are possible as well.

In line with the discussion above, the symbol 314 is shown as taking up more pixels in the DUI 300 than the image of the MAP sensor 310 itself. As such, the user can be able to select the symbol 314 in various ways, such as by clicking/touching within the circular dashed region shown, or even by merely moving a mouse cursor (not shown) within the region. Other ways of selecting the symbol 314 are also possible.

FIG. 5 shows the DUI 300 at a different point in time during a session. In particular, FIG. 5 shows the DUI 300 after selection of the symbol 314 for the MAP sensor 310. After selection of the symbol 314, the user interface 103 displays a window 320 within the DUI 300, overlaying a portion of the image 302 and located to the right of the symbol 314. The window 320 is shown to include a list identifying available information related to the selected vehicle component of interest: the MAP sensor 310.

The window 320 includes a list of selectable identifiers that identify various types of supplemental information related to the MAP sensor 310, where the supplemental information was downloaded with the download but is not yet displayed within DUI 300. In particular, the window 320 includes the following selectable identifiers, each of which is illustrated as a selectable link and each of which identifies supplemental information related to the MAP sensor 310: Component Test 321, Real Fixes 322, R&R Procedure 324, Connector View 325, Component Location 326, Related TSBs 327, Top Codes 328, and Top Symptoms 329. These eight selectable identifiers correspond to the following supplemental information from the download, respectively: (i) component test information, (ii) real-fix information, (iii) removal and replacement information, (iv) connector view information, (v) component location information, (vi) TSB information, (vii) top diagnostic trouble code information, and (viii) top symptom information. After the window 320 is displayed, the CCS can receive a selection of one of the selectable identifiers, and the CCS can then responsively cause the DUI 300 to include the portion of supplemental information that corresponds to the selected identifier. Selection of a given selectable identifier can cause the corresponding portion of supplemental information to be displayed in the current webpage, or can cause the CCS to generate a new webpage that includes the corresponding portion of supplemental information (e.g., a new tab in the Internet browser or a new window in the Internet browser).

Between the Related TSBs identifier 327 and the Top Codes identifier 328, the window 320 is shown to include a section for service estimate information associated with the MAP sensor 310. In particular, the window 320 includes an identifier for the price 330 of service for the MAP sensor 310 (shown as $47.95), and also includes an identifier for the amount of labor 331 for servicing the MAP sensor 310 (shown as 3.2 hours). The price and labor for a given vehicle component can be represented in other ways as well. Further, the window 320 includes a displayed price check box 332 and a displayed labor check box 333 that enable a user to add one, both, or none of price 330 and labor 331 to a service estimate (not shown). Accordingly, a user can select one, both, or none of the check boxes 332, 333. A user can also "uncheck" a given check box to remove price and/or labor from the service estimate. The price check box 332 is shown as selected, and thus the CCS has added the price of service ($47.95) to the service estimate (not shown). Although the labor check box 333 is not shown as selected, a user can later select it as well. Other ways to add/remove service estimate information to/from a service estimate are also possible. Although not shown, after receiving selection (or de-selection) of a given check box, the CCS can provide within the DUI 300 an indication of the service estimate.

Lastly, the window 320 is shown to include a voltage waveform 334 for the MAP sensor 310. The CCS can obtain the electrical measurement data used to present the voltage waveform 334 at various points in time. For example, after selection of the symbol 314, the CCS can transmit a request for a data value associated with a PID used by the MAP sensor 310, receive the data value, convert the data value to obtain the voltage waveform 334, and then include the voltage waveform 334 in the displayed window 320. The voltage waveform 334 can appear in the window 320 before, at the same time as, or after all the other information is displayed. For instance, the selectable identifiers and the service estimate information can be displayed first while the voltage waveform 334 is retrieved/loading, and then the voltage waveform 334 can be displayed once it is retrieved/loaded. Further, in some scenarios, the DUI can also include a selectable identifier (not shown) that identifies PID value information for the PID of the MAP sensor 310.

In practice, if a user is not licensed or otherwise authorized to view any of the information associated with the MAP sensor 310, the DUI 300 may not include such information.

FIG. 6 shows the DUI 300 at another different point in time during a session. In particular, FIG. 6 shows the DUI 300 after selection of the Component Test identifier 321. After selection of the Component Test identifier 321, the user interface 103 displays a second window 350 within the DUI 300, overlaying a portion of the image 302, overlaying a portion of window 320, and located to the right of window 320. The second window 350 is shown to include a portion of the downloaded supplemental information associated with the Component Test identifier 321 for the MAP sensor—namely, a diagnostic flowchart to help a user determine whether the MAP component is operating properly. The second window 350 is also shown to include a selectable DUI element 351 (depicted as a "Return" button) that, when selected, can close the second window 350 and return the user to the DUI shown in FIG. 5. Any window discussed herein (including windows for displaying other portions of supplemental information) can include such a selectable element for enabling a user to navigate to a previous window, previous webpage, etc.

In other examples, the second window 350 can be larger in size and can thus take up more or less space of the DUI 300 than as shown in FIG. 6. For example, after selection of the Component Test identifier 321, the second window 350 can take up the entire DUI 300, overlaying the entirety of the image 302. Again, as noted above, selection of a given selectable identifier can cause the corresponding portion of supplemental information to be displayed in the current webpage (e.g., second window 350), or can cause the CCS to generate a new webpage that includes the corresponding portion of supplemental information.

V. Additional Example Operations

Additional example operations relating to vehicle diagnostic displays will now be described. In particular, such additional operations can relate to viewing both real-time and non-real-time electrical measurements associated with various vehicle circuits.

Next, FIG. 7 shows a flowchart depicting a set of functions 390 (or more simply "the set 390") that can be carried out in accordance with the example embodiments described in this description. The set 390 includes the functions shown in blocks labeled with whole numbers 391 through 396 inclusive. The following description of the set 390 includes references to elements shown in other figures described in this description, but the functions of the set 390 are not limited to being carried out only by the referenced elements. A variety of methods can be performed using all of the functions shown in the set 390 or any proper subset of the functions shown in the set 390. Any of those methods can be performed with other functions such as one or more of the other functions described in this description. One or more of the functions shown in the set 390 can be carried out multiple times in performing a method in accordance with the example embodiments. Further, the processor 101 of the CCS 100 can execute the CRPI 109 discussed above to cause some or all of the set 390 to be performed.

In some implementations, one or more of the CCS's described herein (e.g., CCS 100 or CCS 2) can be configured to receive a download of information, which can include some, all, or none of the information discussed above. In particular, one or more of the elements of the CCS can be configured to receive the download, such as one or more processors connected to a display (e.g., the processor 101 of CCS 100, connected to user interface 103). The download can be received in a manner similar to or different from the manner discussed above. For instance, the CCS 100 can receive user-input representing a request for the download, the request including various information regarding a particular vehicle or vehicle component (e.g., client ID 110, a VIN, a YMM, a YMME, etc.), and the server can then accordingly use such information to assemble the download for the CCS 100 and transmit the download to the CCS 100. The server can assemble and transmit the download in any of the manners discussed above.

Block 391 includes receiving a download including (i) an image representative of at least one circuit in a vehicle, the at least one circuit including a first circuit configured for carrying a first signal within the vehicle, and (ii) symbol data associated with at least one symbol, the at least one symbol including a first symbol. The first signal can be electrical or optical. Any given circuit represented by the image, including the first circuit, can take various forms, such as a crankshaft position (CKP) sensor ignition feed circuit, a CKP sensor signal input circuit, a CKP sensor reference low circuit, a CKP sensor ground circuit, a MAP sensor air flow circuit, a MAP sensor voltage source circuit, an ambient air temperature sensor circuit, among other possibilities.

Further, the processor 101 can be configured to receive data representing values of various circuit signals, such as the first signal carried by the first circuit.

The download can be received in a manner similar to or different from the manner discussed above. For instance, the CCS 100 can receive, via the user interface 103, user-input representing a request for the download, the request including various information regarding a particular vehicle or vehicle component (e.g., client ID 110, a VIN, a YMM, a YMME, etc.), and the server can then accordingly use such information to assemble the download for the CCS 100 and transmit the download to the CCS 100. The server can assemble and transmit the download in any of the manners discussed above.

In some implementations, the download can also include data indicative of a message to request a VDM including data representing values of a signal carried by a circuit. The data indicative of the message to request a VDM can include, for instance, a PID and an ECU identifier, which can be used as part of a process for requesting and receiving, from the vehicle, data representing values of various signals carried by various circuits, as described below.

Next, block 392 includes displaying, on a display after receiving the download, the image and the at least one symbol. The user interface 103 can display the image and the at least one symbol in various ways, such as in any one of the manners discussed above. The displayed image can include, for instance, three circuits (e.g., the entirety of three circuits, or three portions of respective larger circuits), each circuit represented by a displayed symbol.

Next, block 393 includes receiving, while the image and the at least one symbol are displayed on the display, a first input corresponding to selection of the first symbol. In general, the processor 101 can receive an input corresponding to selection of any one of the displayed symbol(s), which can be considered a selection of the circuit to which the selected symbol corresponds. Receiving the first input can include the processor 101 receiving, via the user interface 103, a first user-input representing a selection of the first symbol. Such a selection of the first symbol can take the form of one of the hotspot-selection types discussed above (e.g., hovering over the first symbol, bringing a mouse cursor within a predetermined threshold distance from the first symbol, or clicking/double-clicking the first symbol).

The first input can represent a request for data from the vehicle, such as a first request for at least one value of the first signal. As such, block 394 includes receiving, from the vehicle in response to receiving the first input, data representing at least one value of the first signal.

The processor 101 can receive such data in various ways. In line with the discussion above, for instance, in response to receiving the first input, a vehicle interface device of the CCS 100 such as the DLC interface 105 can transmit, directly and/or via the transceiver 104, the first request to the vehicle (e.g., the ECU within the vehicle) over a network to which CCS 100 is connected, such as the client-to-vehicle network described above. Similar to the requests discussed above, the first request in this scenario can include various information that identifies the first circuit, the first signal, the ECU within the vehicle, and/or other aspects of the vehicle. To facilitate this in practice, as noted above, the download can include a first identifier, such as a PID, that identifies the first circuit and/or the first signal, and can also include an ECU identifier for identifying the ECU. Upon receipt of the first request, the ECU can responsively obtain, and then transmit to the CCS 100 over the client-to-vehicle network, a response including the value(s) of the first signal. The vehicle interface device of the CCS 100 can then at some point receive the response, from the ECU via the transceiver 104, transmit the response to the processor 101, and the processor 101 can process the response to determine the value(s). The response can take the form of a VDM or other type of message.

As an example, the request can include (i) the client ID, (ii) an ECU identifier, (iii) a value corresponding to a particular diagnostic mode of operation—namely a value corresponding to a request for parameter data, and (iv) a PID for a vehicle component (e.g., sensor) with which the first circuit is associated (e.g., a PID for a MAP sensor if the first circuit is a circuit connected to the MAP sensor). In this example, the ECU's response can then include the client ID, the ECU identifier, the diagnostic mode value, the PID, and the value(s) (e.g., the latest MAP sensor value). The type of request and content of the request can vary from vehicle to vehicle and can depend on how the vehicle is configured (e.g., how one or more components of the vehicle, such as the ECU, are configured).

In alternative implementations, the processor 101 can receive the value(s) from an electronic measuring instrument (e.g., a digital volt-ohmmeter, digital multimeter, or the like) at an electrical measurement input to which the electronic measuring instrument is connected. This can be advantageous in scenarios in which value(s) are requested for a sensor in which there is no PID data, such as a CKP sensor.

The value(s) received from the vehicle can take various forms. For instance, the value(s) can include (i) a baseline value of the first signal, (ii) at least one minimum code setting value of the first signal, (iii) at least one maximum code setting value of the first signal, (iv) a most-recent measured value of the first signal (e.g., as the first signal is measured in real-time), (v) a minimum measured value of the first signal, and/or (vi) a maximum measured value of the first signal. The "data representing the at least one value of the first signal" can include one or more of these values (e.g., the most-recent measured value, the minimum measured value, and the maximum measured value. In some scenarios, receiving the data can involve receiving all of these values at substantially the same time. In other scenarios, receiving the data can involve receiving one or more of these values at one point in time and then later receiving a different one or more of these values at another point in time.

A "baseline value" is a value captured at some point in time from a measurement carried out on the vehicle (or on other vehicles of the same YMM of the vehicle), such as a measurement carried out by a digital volt-ohmmeter or a diagnostic scan tool that interrogates the ECU for PID values. As a general matter, baseline values can be stored with operating characteristics, such as engine RPM or temperature. Further, baseline values can obtained when a vehicle is operating without fault. As such, data values captured when the vehicle is operating with a fault can be compared to the baseline values, thereby giving the vehicle or the technician an indication as to what the fault is (the baseline values could also be compared with data values when the vehicle is operating without fault to provide confirmation the vehicle is operating as expected). Still further, the baseline values can also be obtained for a single unique vehicle and compared to data values captured later from that same exact vehicle. Yet still further, any baseline value can take the form of a single value (e.g., 4.65 V) or a range of values (e.g., 4.5-4.8 V).

A "code setting value" is set by the vehicle manufacturer engineers when developing the vehicle, and refers to a signal value that the ECU of the vehicle uses to set a given DTC from not active to active.

Any one or more of these values discussed above can be included with the download rather than received by the CCS 100 from the vehicle in response to the first request. For instance, the download can include a baseline value of the first signal, whereas other values of the first signal are received from the vehicle in response to the first request. In particular, the baseline value and/or the code setting value(s) can be known by the vehicle (or possibly by the SCS 4 or other entity from which the CCS 100 could receive such values) prior to receiving the download or received as part of the download, whereas values such as the most-recent measured value and the minimum/maximum measured values can be values captured in the time since the download was assembled/received.

In some scenarios, the first request can indicate a request for only one most-recent measured value of the first signal, and accordingly, the ECU can provide such a value. In other scenarios, however, the first request can indicate a request for repeated (e.g., continuous or periodic) most-recent measured values of the first signal in real-time (e.g., a request to provide the CCS 100 with updated measured values every 100 milliseconds (ms)). To facilitate this in practice, the ECU can be configured to interpret the first request such that the ECU is then triggered to enter a mode in which the ECU will repeatedly transmit the updated values (e.g., every 100 ms). Alternatively, if the ECU is not configured to enter such a mode, the user-selection of the first circuit can trigger the CCS 100 to repeatedly transmit to the ECU a request for a single, updated most-recent measured value. For example, the CCS 100 can transmit a request for a single, updated most-recent measured value every 100 ms. Most-recent measured values can be requested/received in other manners as well.

In scenarios where the CCS 100 repeatedly receives most-recent measured values, the CCS 100 can use such values to update any previous minimum or maximum measured values. For example, if the CCS 100 at one point receives a maximum measured value of 5 volts (V), but later receives a most-recent measured value of 6 V, the CCS 100 can adjust the maximum measured value to be 6 V. Alternatively, the ECU itself can provide updated minimum or maximum measured values.

Referring back to the set 390, block 395 next includes determining a first display-location on the display at which to display the data representing the at least one value of the first signal. Block 396 then includes displaying, on the display at the first display-location while the image and the at least one symbol are displayed on the display, the data representing the at least one value of the first signal.

In some examples, the processor 101 can determine the first display-location to be proximate in space on the DUI to a location at which the first circuit is being displayed on the DUI. Similarly, in examples where data for other circuits is displayed, the processor 101 can determine respective display-locations for such data that are proximate to the corresponding circuits. Herein, the term "proximate" can refer to a location of one graphical element on a DUI (e.g., the image, the first symbol, the data representing the at least one value of the first signal, etc.) being within a threshold extent of pixels from another graphical element on the DUI—namely, such that a user viewing the DUI could appreciate that the two graphical elements are associated with one another.

Figure 8:
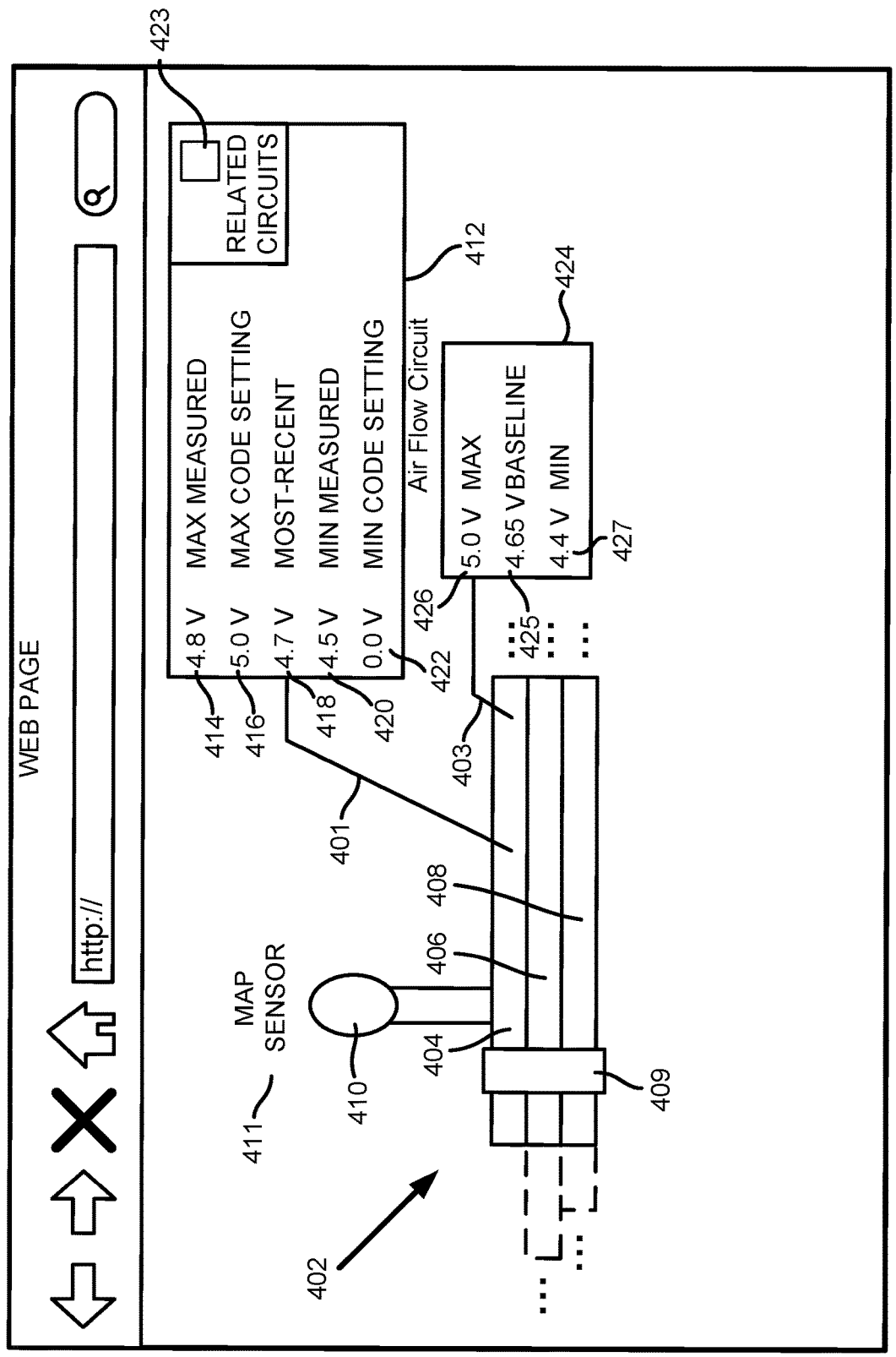
FIG. 8 shows an example display user interface.
Figure 9:
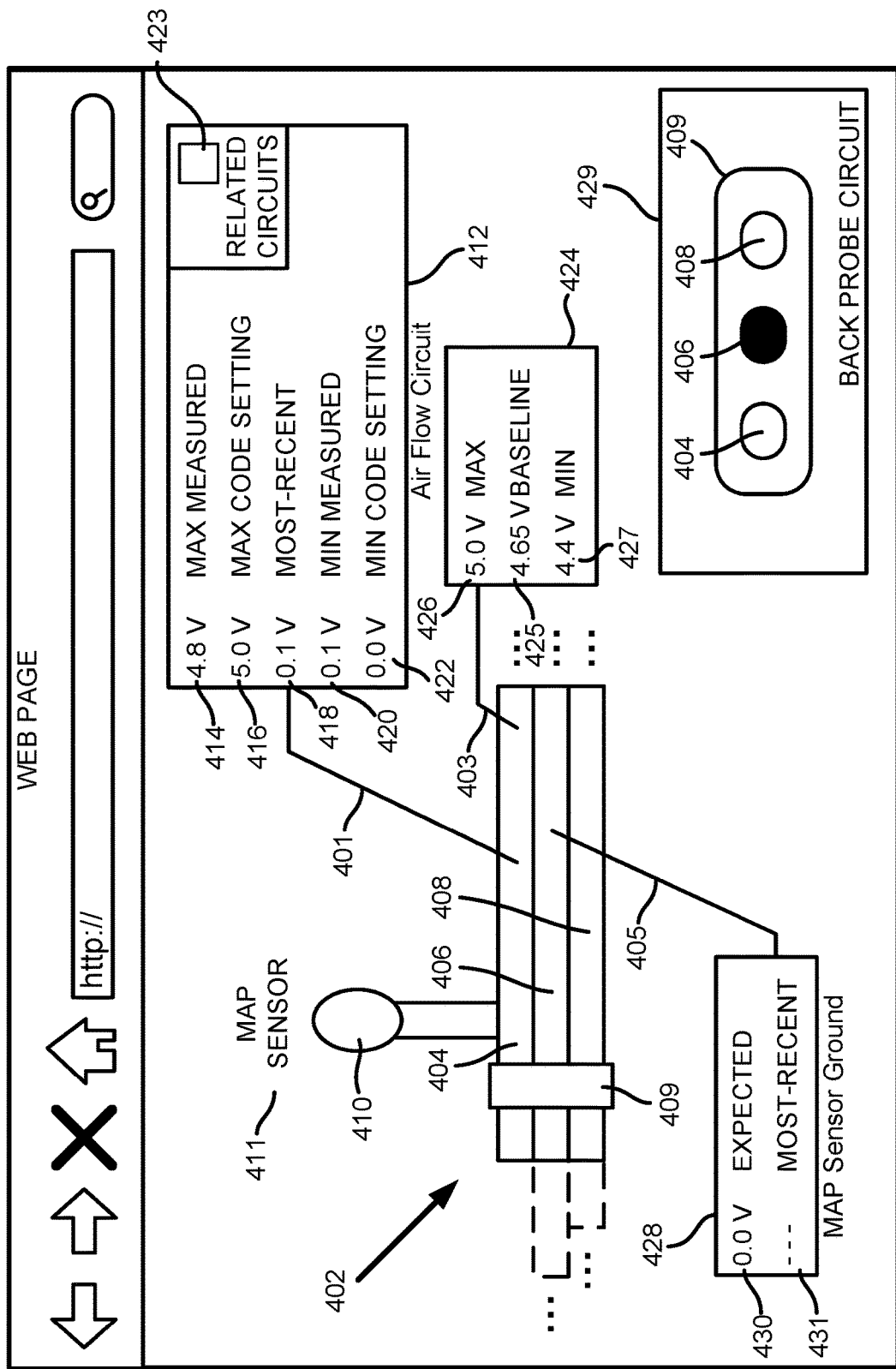
FIG. 9 shows an example display user interface.
Figure 10:
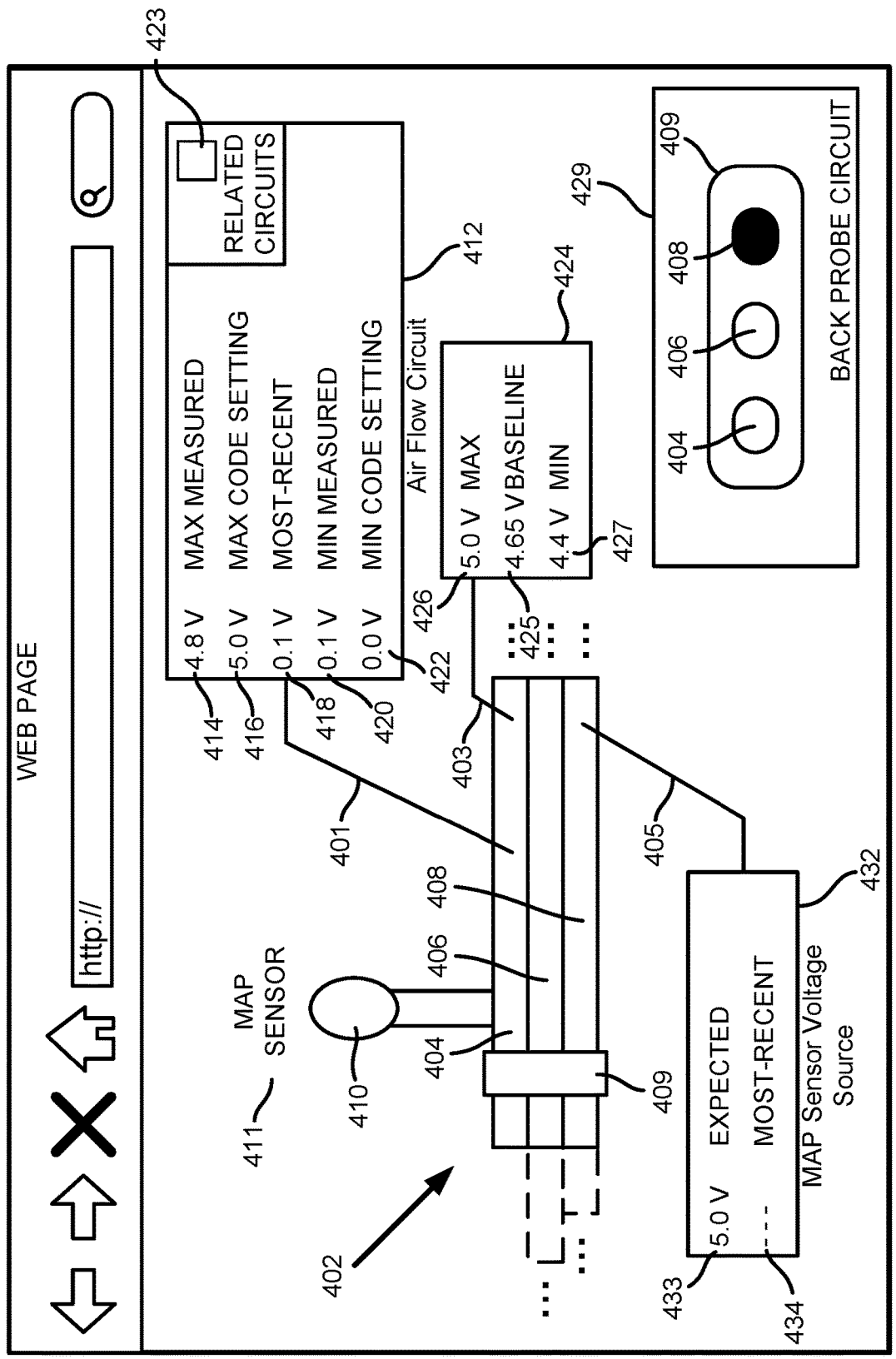
FIG. 10 shows an example display user interface.

Additionally or alternatively, in other examples, the user interface 103 can display connector lines that connect one graphical element to another graphical element with which the one graphical element is associated. Such connector lines can appear on the DUI as a way to indicate to a user viewing the DUI that the two graphical elements are associated with one another, regardless of whether the two graphical elements are proximate to one another. Examples of connector lines 401, 403, 405, and 407 are shown in FIG. 8, FIG. 9, FIGS. 10, and/or 11.

In some embodiments, displaying the data representing the value(s) of the first signal can include the user interface 103 displaying the data on the DUI such that the data overlays the image, one or more symbols, and/or another area of the DUI. For example, as shown in FIG. 8, the data can be displayed as a pop-up window proximate to the first symbol in the top-right corner of the DUI and connected via a connector line to the first symbol so as to indicate that the pop-up window is associated with the first symbol (i.e., associated with the first circuit). The data can be displayed in other forms as well.

Determining the first display-location can include the processor 101 determining that the user interface 103 should display simultaneously, at the first display-location, the most-recent value of the first signal, the minimum value of the first signal, and the maximum value of the first signal. Accordingly, displaying the data representing the value(s) of the first signal can include the user interface 103 displaying simultaneously, at the first display-location, the most-recent value of the first signal, the minimum value of the first signal, and the maximum value of the first signal.

In scenarios where the CCS 100 receives at least one minimum code setting value of the first signal and/or at least one maximum code setting value of the first signal, determining the first display-location can include the processor 101 determining that the user interface 103 should display simultaneously, at the first display-location, the data and the minimum and/or maximum code setting values (e.g., displaying simultaneously the most-recent value of the first signal, the minimum value of the first signal, the maximum value of the first signal, and the minimum and maximum code setting values). The user interface 103 can then display simultaneously, at the first display-location, the data and the minimum and/or maximum code setting values.

In some embodiments, the processor 101 can also determine a second display-location on the DUI at which to display the baseline value associated with the first circuit, and then the user interface 103 can display the baseline value at the second display-location while also displaying the image and the at least one symbol. The second display-location can be distinct from the first display-location or can be substantially the same location.

In some implementations, the image can include a first portion representative of a first circuit and additionally include at least one other portion representative of at least one other circuit that is related to the first circuit and configured for carrying respective signals within the vehicle. For instance, the image can include a first portion representative of a first circuit and additionally a second portion representative of a second circuit that is related to the first circuit and configured for carrying a second signal within the vehicle.

Circuits that are "related" are circuits on and/or within a vehicle that are commonly inspected to diagnose a common vehicle condition (e.g., a customer complaint or vehicle symptom). A person skilled in the art will understand that in some instances only one of multiple related circuits need to be inspected to diagnose a common vehicle condition if inspection of that one circuit occurs prior to inspection of the other circuit(s) and is found to be the cause of the vehicle condition. A person skilled in the art will understand that multiple related circuits may comprise circuits inspected to certify that a service action has successfully resolved the common vehicle condition. As an example, an electrical ground circuit and a battery voltage supply circuit to a common ECU can be related as such circuits are commonly inspected when diagnosing a vehicle condition pertaining to the common ECU. As yet another example, multiple circuits identified in a diagnostic flowchart produced for and/or by a vehicle manufacturer to diagnose a particular vehicle condition are related circuits as those multiple circuits are commonly inspected during performance of the diagnostic flowchart. For instance, a circuit connected to a MAP sensor and a circuit connected to an ambient air temperature sensor can be related as both of those circuits can be identified in a single diagnostic flowchart and inspected during performance of the flowchart.

Further, circuits can be deemed to be "related" when they are connected in parallel and share the same ground and/or power source.

In such implementations, the act of displaying the image can, in some scenarios, involve the user interface 103 displaying both the first and second portions of the image together (i.e., displays both the first and second circuits) such that both appear in view in the DUI. Alternatively, in other scenarios, the act of displaying the image can involve the user interface 103 displaying the first portion without displaying the second portion (i.e., displays only the first circuit at first). This can happen for various reasons. For instance, in order to have a sufficiently-sized view of the first circuit on the DUI, it can be desirable to display the first circuit (and perhaps other circuits that are close in proximity to the first circuit in the vehicle), but not display any of the related circuits such as the second circuit that are located remotely from the first circuit in the vehicle (e.g., one sensor can be located near one end of the vehicle and the other sensor can be located near the opposite end of the vehicle, and thus the circuits for these sensors may not be displayed together at the same time).

In either scenario, the user interface 103 can also display—either at the first display-location with the data representing the at least one value of the first signal (e.g., in the same pop-up window as the data) or at a different location—a selection graphic associated with the second circuit. Displaying the selection graphic can include the user interface 103 displaying a check box, radio button, etc. within the DUI. At some point after the user interface 103 displays the selection graphic, the processor 101 can receive an input corresponding to selection of the selection graphic. For example, such an input can take the form of a user checking a check box.

In response to receiving the input, the CCS 100 can perform various actions. For example, in the scenario in which both the first and second portions of the image are being displayed, the processor 101 can receive data representing at least one value of the second signal. The act of the processor 101 receiving such data can occur in any manner discussed above (e.g., CCS 100 transmits request to the ECU, the ECU responds, etc.). The processor 101 can then determine a second-display location on the DUI at which to display the data representing the value(s) of the second signal, and the user interface 103 can display the data representing the value(s) of the second signal while displaying the image, the at least one symbol, and the data representing the value(s) of the first signal.

On the other hand, in the scenario in which first portion of the image is displayed without the second portion of the image, in response to receiving the input, (i) the processor 101 can receive the data representing the value(s) of the second signal and (ii) the user interface 103 can display the second portion of the image on the DUI. The user interface 103 displaying the second portion of the image on the DUI can involve displaying the second portion of the image while displaying the first portion of the image. For example, displaying the second portion of the image while displaying the first portion of the image can involve displaying both the first and second portions of the image such that they take up substantially the same amount of space on the DUI. As another example, displaying the second portion of the image while displaying the first portion of the image can involve displaying both the first and second portions of the image such that they take up different amounts of space on the DUI. As a more particular example, the input can trigger the user interface 103 to animate the DUI such that a zoomed-out view of the first portion of the image is shown while a zoomed-in view of the second portion of the image is shown. Other examples are possible as well.

Alternatively, the user interface 103 displaying the second portion of the image on the DUI can involve displaying the second portion of the image without displaying the first portion of the image. For instance, displaying the second portion of the image without displaying the first portion of the image can involve the user interface 103 replacing the first portion of the image with the second portion of the image—either at the same display-location on the DUI, at a different display-location, or perhaps on a new webpage. As a more particular example, the input can trigger the user interface 103 to animate the DUI such that the first portion of the image disappears (e.g., zoom out of the image until the first portion is no longer visible) and the second portion of the image automatically appears (e.g., zoom into the image until the second portion is visible). Other examples are possible as well.

The processor 101 can then determine a second-display location on the DUI at which to display the data representing the value(s) of the second signal, and the user interface 103 can display the data representing the value(s) of the second signal while displaying the image, the at least one symbol, and the data representing the value(s) of the first signal. In either scenario, the second display-location can be the same as or distinct from the first display-location.

In these scenarios described above, all portions of the image can be received as part of the initial download, or can alternatively be received at different points in time. For example, upon selection of the selection graphic, the CCS 100 can (i) transmit to the SCS 4 a request for an additional portion of the image representing the related circuit(s) (or a new image entirely that represents the related circuit(s), for that matter), (ii) receive from the SCS 4 the requested portion of the image (or new image), and (iii) display the requested portion of the image (or new image). Other examples are possible as well.

In some scenarios, certain values that the CCS 100 receives and the user interface 103 displays can be different from what might be considered normal. For instance, a value being above or below an expected value (e.g., a code setting value or even a minimum/maximum measured value) can possibly indicate a fault. In such scenarios, the user interface 103 can display abnormal values in a manner that indicates to the technician that the values are abnormal. By way of example, the user interface 103 can display a box around an abnormal value, change the color of the text of the abnormal value, or highlight the abnormal value in some other manner. Other examples are possible as well.

VI. Additional Example Display User Interfaces

FIG. 8, FIG. 9, FIG. 10, and FIG. 11 show an example CCS-provided DUI 400 at three different points in time during a session for an interactive vehicle diagnostic display. In particular, the DUI 400 shows that the interactive vehicle diagnostic display is in the form of a web page in an Internet browser. The CCS that provides the DUI 400 can be any client configured like the CCS 2 or the CCS 100, and can provide the DUI 400 by way of a user interface configured like the user interface 103 of CCS 100. The DUI 400 includes an image representing a portion of a wiring harness for a vehicle having a particular YMME. Although the DUI 400 does not show the YMME associated with the vehicle component, in some scenarios the YMME can be displayed as part of the DUI 400. Other examples of ways in which a DUI can represent an interactive vehicle diagnostic display are also possible. Other examples of vehicle components that can be displayed are also possible.

FIG. 8 shows the DUI 400 including an image of a wiring harness 402 similar to the wiring harness 302 shown in FIGS. 4, 5, and 6. Displayed as part of the image 402 are the following: a first circuit 404, a second circuit 406, a third circuit 408, a connector 409 holding the three circuits together, a MAP sensor 410 connected to the wiring harness, and a text label 411 for the MAP sensor 410. Although not labeled as part of the image 402, in this example scenario the first circuit 404 is an air flow circuit, the second circuit 406 is a MAP sensor ground circuit, and the third circuit 408 is a MAP sensor voltage source circuit.

As noted above, in practice, a download that the CCS receives can include image data representative of a full image of the wiring harness, but the CCS may not display the entire image at once. Rather, the CCS can display only a portion of the image, but the DUI 400 can enable a user to navigate to other portions of the image. For example, in order to view other portions of the image, such as portions representative of additional circuits and sensors, the CCS can provide as part of the DUI 400 one or more user-selectable navigation tools, such as navigation arrows that, when selected, cause a different portion of the image to be displayed. Other examples are possible as well.

In particular, FIG. 8 shows the DUI 400 after selection of the first circuit 404 (i.e., after selection of a first symbol, which can be displayed in the same pixel region as the image of the first circuit 404 appears). In alternate embodiments, the MAP sensor 410 can be a hotspot itself rather than the first circuit. In such embodiments, the first symbol can be associated with the MAP sensor instead of with the first circuit, and can be displayed in the same pixel region as the image of the MAP sensor 410 appears. Accordingly, after selection of the MAP sensor 410, the DUI 400 can appear in the same manner shown in FIG. 8, or can appear in a different manner.

In response to the selection of the first circuit 404, the CCS 100 (via the DLC interface) can request a VDM and receive a VDM including data representing value(s) of a first signal carried by the first circuit 404, and the user interface 103 can then display that data. As such, the DUI 400 shown in FIG. 8 also includes a first pop-up window 412 connected via a connector line to the first circuit 404 so as to indicate that the first pop-up window 412 is associated with the first circuit 404. Below the first pop-up window 412 is a text label, "Air Flow Circuit", identifying the first circuit 404. The first pop-up window 412 includes various value(s) received by the CCS 100 from the ECU of the vehicle for the air flow circuit, such as (i) a maximum measured voltage 414 (depicted as 4.8 V at the illustrated point in time), (ii) a maximum code setting voltage 416 (depicted as 5.0 V at the illustrated point in time), (iii) a most-recent measured voltage 418 (depicted as 4.7 V at the illustrated point in time), (iv) a minimum measured voltage 420 (depicted as 4.5 V at the illustrated point in time), and (v) a minimum code setting voltage 422 (depicted as 0.0 V at the illustrated point in time). Some of these values can be "live" (i.e., real-time), such as the most-recent measured voltage 418, in line with the discussion above. The maximum measured voltage 414 and the minimum measured voltage 420 can also be considered to be "live" values, as the ECU can provide adjusted minimum/maximum measured voltage values based on how the most-recent measured voltage 418 changes. Further, some of these values can be predetermined, static values that were received with the download, such as the maximum code setting voltage 416 and the minimum code setting voltage 422.

In the alternate embodiments discussed above in which the MAP sensor 410 is selected, the first pop-up window 412 and/or any other pop-up windows discussed herein can be displayed in response.

In practice, other pop-up windows associated with other circuits can take forms similar to that of the first pop-up window 412 or can take other forms.

As shown, the first pop-up window 412 also includes a "Related Circuits" selection graphic 423 depicted as an unchecked check box.

Further, selection of the first circuit 404 can also trigger the user interface 103 to display on the DUI 400 a baseline pop-up window 424 including a baseline voltage 425 (depicted as 4.65 V). The baseline pop-up window also includes an operating range for similar vehicles operating normally/properly. For instance, the maximum measured voltage 426 across multiple vehicles is depicted as 5.0 V and the minimum measured voltage 427 across multiple vehicles is depicted as 4.4 V. The baseline voltage 425, maximum measured voltage 426, and/or minimum measured voltage 427 can be received with the initial download and displayed on the DUI 400 only when the first circuit 404 is selected, or can be requested and received from the vehicle in response to the selection of the first circuit 404 and then also displayed on the DUI 400 in response to the selection of the first circuit 404. The baseline voltage 425 can indicate voltage(s) previously measured on a circuit connected to the MAP sensor in the vehicle and/or can indicate voltage(s) previously measured on a circuit connected to the same type of MAP sensor in one or more other vehicles. A person skilled in the art will understand that the baseline pop-up window 424 can display baseline measurements other than a voltage, such as a frequency, resistance, duty-cycle, amperage, etc.

In some scenarios, a measured value for a given circuit can be out of range of the maximum and minimum measured values, which can indicate a problem with the circuit. In such scenario it may be desirable for the CCS 100 to cause the user interface 103 to display on the DUI 400 a walkthrough/guide of how to potentially diagnose the problem, such as by prompting the technician to use a measuring tool and guiding the technician step-by-step to measure values of circuits that are associated with the problem circuit, but for which there is no PID data. Examples of such circuits are the ground and source voltage. FIGS. 9-10 show an example of such a scenario.

In particular, FIG. 9 shows the DUI 400 in an example scenario after the most-recent measured voltage 418 (depicted as 0.1 V at the illustrated point in time) is out of range (e.g., out of the 4.4-5.0 V baseline operating range), thus indicating a problem with the MAP sensor. The out-of-range most-recent measured voltage 418 can trigger the user interface 103 to display on the DUI 400 (i) a second pop-up window 428 and (ii) a walkthrough pop-up window 429. Below the second pop-up window 428 is a text label, "MAP Sensor Ground", identifying the second circuit 406. The second pop-up window 428 includes two values for the MAP sensor ground: (i) an expected value 430 for the second circuit 406 (depicted as 0.0 V at the illustrated point in time) and (ii) a most-recent measured value 431. The most-recent measured value 431 is depicted as blank at the illustrated point in time, but can be populated with an actual voltage value once the technician has performed the measurement on the second circuit 406. The technician can then compare the most-recent measured value 431 with the expected value 430 to determine whether there is a problem with the second circuit 406.

To facilitate this, the walkthrough pop-up window 429 includes a cross-sectional view of the connector 409 of the wiring harness, including cross-sectional views of pin-outs for the first circuit 404, the second circuit 406, and the third circuit 408. As shown at this point in time of the step-by-step walkthrough, the pin-out for the second circuit 406 is highlighted, identifying for the technician which circuit should be measured. In some implementations, the walkthrough pop-up window 429 can generally include information describing in various levels of detail how to perform the measurement. (In alternate implementations, the walkthrough pop-up window 429 can include pin-outs for other circuits that are related to the MAP sensor, such as an ambient air temperature sensor voltage source circuit.)

FIG. 10 shows the DUI 400 at a different point in time in the example scenario discussed above in which the most-recent measured voltage 418 (still depicted as 0.1 V) out of range. The DUI 400 shows third pop-up window 432, which the user interface 103 can display after the technician has provided user-input indicating that measurement of the second circuit 406 is complete, after a predetermined period of time has expired (e.g., five minutes), before the second pop-up window is displayed on the DUI 400, or at some other point in time, possibly in response to some other trigger event. Below the third pop-up window 432 is a text label, "MAP Sensor Voltage Source", identifying the third circuit 408. The third pop-up window 432 includes two values for the MAP sensor voltage source: (i) an expected value 433 for the third circuit 408 (depicted as 5.0 V at the illustrated point in time) and (ii) a most-recent measured value 434. Again, the most-recent measured value 434 is depicted as blank at the illustrated point in time, but can be populated with an actual voltage value once the technician has performed the measurement on the third circuit 408. The technician can then compare the most-recent measured value 431 with the expected value 430 to determine whether there is a problem with the third circuit 408.

To facilitate this, in line with the discussion above, the walkthrough pop-up window 429 again includes a cross-sectional view of the connector 409 of the wiring harness, including cross-sectional views of pin-outs for the first circuit 404, the second circuit 406, and the third circuit 408. However, as shown at this different point in time of the step-by-step walkthrough, the pin-out for the third circuit 408 is highlighted, again identifying for the technician which circuit should be measured.

It should be understood that the second pop-up window 428, the third pop-up window 432, and/or any other type of information with the second and third circuits can be displayed on the DUI 400 in response to trigger events other than an out-of-range value. For instance, the second pop-up window 428 and the third pop-up window 432 can be displayed on the DUI 400 in response to a selection of the selection graphic 423.

Figure 11:
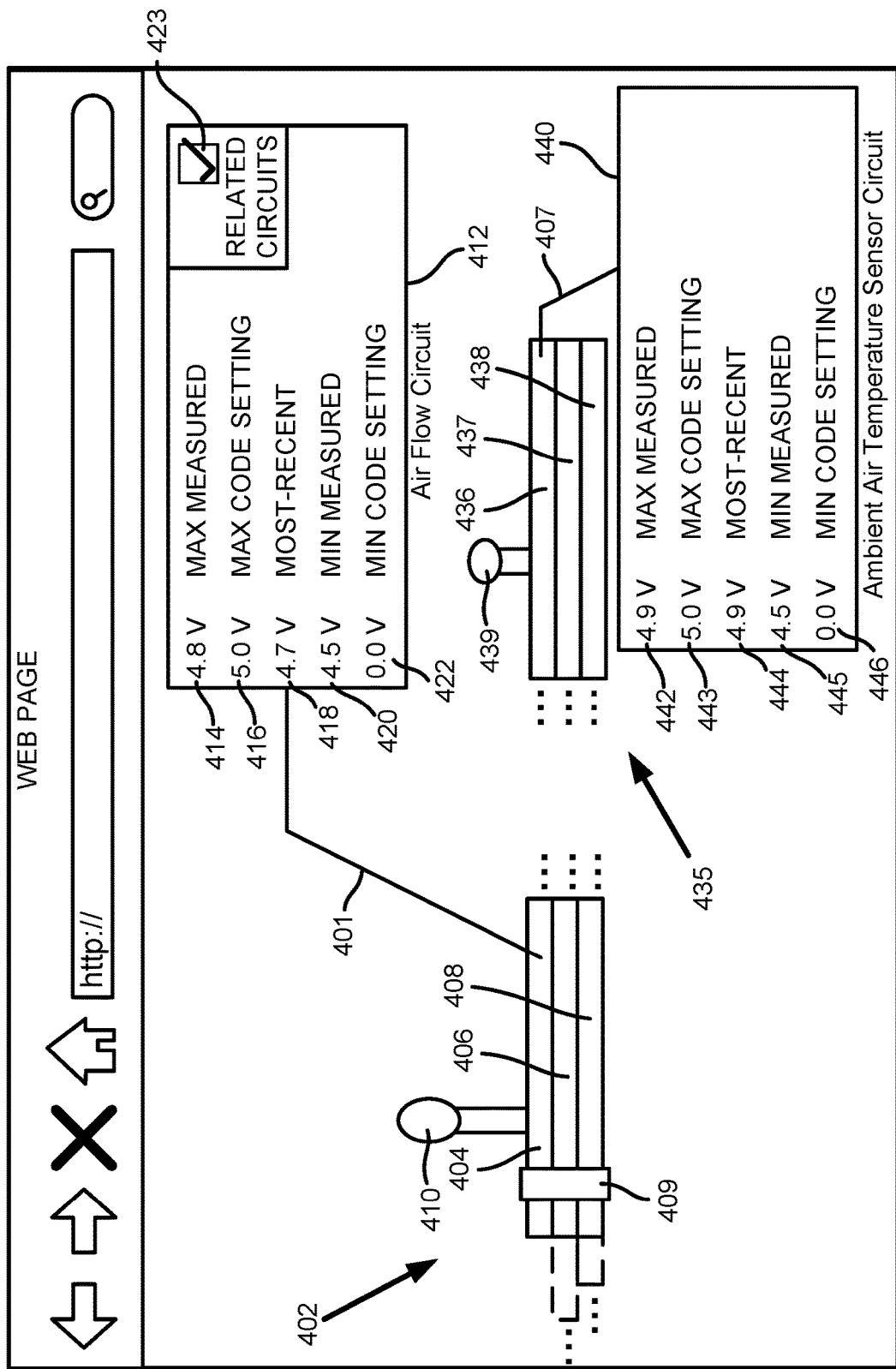
FIG. 11 shows an example display user interface.

FIG. 11 shows the DUI 400 at a different point in time during a session. In particular, FIG. 11 shows the DUI 400 in an example scenario after selection of the selection graphic 423. The selection graphic 423 is depicted as checked check box. In this scenario, after selection of the selection graphic 423, the user interface 103 displays another image 435 (which can also be considered another portion of image 402) a wiring harness that was not previously displayed. In doing so, the user interface 103 can zoom out on image 402 as shown such that image 402 is smaller, and display the other image 435 while also displaying image 402. Displayed as part of the other image 435 are the following: a fourth circuit 436, a fifth circuit 437, a sixth circuit 438, and an ambient air temperature sensor 439 connected to the wiring harness. Although not labeled as part of the other image 435, in this example scenario the fourth circuit 436 is an ambient air temperature sensor circuit (signal values of which would indicate the ambient air temperature of the vehicle), the fifth circuit 437 is an ambient air temperature ground circuit (which could be a common ground shared between multiple sensors, or could be a separate ground), and the sixth circuit 438 is an ambient air temperature sensor voltage source circuit.

The DUI 400 also includes a fourth pop-up window 440 connected via a connector line to the fourth circuit 436 so as to indicate that the first pop-up window 440 is associated with the fourth circuit 436. Below the fourth pop-up window 440 is a text label, "Ambient Air Temperature Sensor Circuit", identifying the fourth circuit 436. The fourth pop-up window 440 includes five value received by the CCS 100 from the ECU of the vehicle for the ambient air temperature sensor circuit, such as (i) a maximum measured voltage 442 (depicted as 4.9 V at the illustrated point in time), (ii) a maximum code setting voltage 443 (depicted as 5.0 V at the illustrated point in time), (iii) a most-recent measured voltage 444 (depicted as 4.9 V at the illustrated point in time), (iv) a minimum measured voltage 445 (depicted as 4.5 V at the illustrated point in time), and (v) a minimum code setting voltage 446 (depicted as 0.0 V at the illustrated point in time).

In practice, the fourth pop-up window 440 can be displayed automatically as a further action performed by the CCS 100 in response to the selection of the selection graphic 423 (e.g., perhaps if the fourth circuit 436 is deemed to be closely related to the first circuit 404), or alternatively can be displayed in response to a user selection of the fourth circuit 436. VII.

Example Computing Systems

Figure 12:
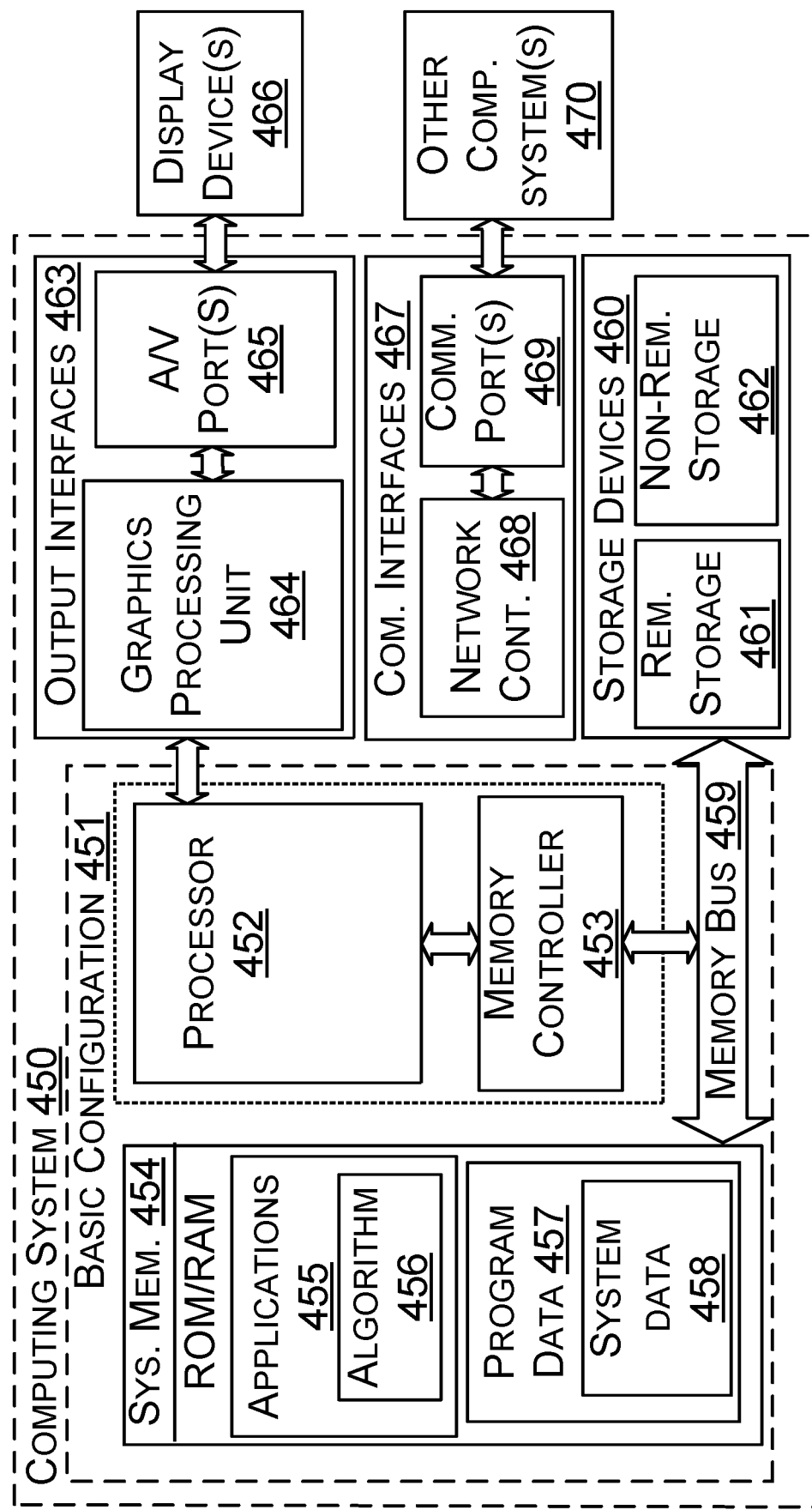
FIG. 12 is a functional block diagram illustrating a computing system that is arranged in accordance with at least some example embodiments.

As described above, the computing systems described herein can be any of a number of different types of computing systems. FIG. 12 is a functional block diagram illustrating an example computing system 450 used in a computing system that is arranged in accordance with at least some embodiments described herein. In a basic configuration 451, the computing system 450 can typically include one or more processors 452 and system memory 454. A memory bus 459 can be used for communicating between the processor 452 and the system memory 454. Depending on the desired configuration, processor 452 can be of any type including but not limited to a microprocessor (µP), a microcontroller (µC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. System memory 454 can include one or more applications 455, and program data 457. The application 455 can include an algorithm 456 that is arranged to perform the functions described as being performed by the CRPI 109 or other functions described in this description. The program data 457 can include system data 458 that could be directed to any number of types of data, such as one more of the following types of data: the CCS ID 110, the VDM 114, the captured data 115, and/or the server data 118. In some example embodiments, the applications 455 can be arranged to operate with the program data 457 on an operating system executable by the processor 452.

The computing system 450 can have additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives and/or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, and/or other data such the data stored in computer-readable medium 102 and 134.

The system memory 454 and the storage devices 460 are examples of computer-readable medium, such as the computer-readable medium 102. The system memory 454 and the storage devices 460 can include, but is not limited to, RAM, ROM, EEPROM, flash memory and/or other memory technology, CD-ROM, digital versatile disks (DVD) and/or other optical storage, magnetic cassettes, magnetic tape, magnetic disk storage and/or other magnetic storage devices, and/or any other medium which can be used to store the desired information and which can be accessed by the computing system 450.

The computing system 450 can include or be implemented as a portion of a small-form factor portable (i.e., mobile) electronic device such as a smartphone (e.g., an IPHONE® smartphone from Apple Inc. of Cupertino, California, or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The CRPI 109, the application 455, and/or the program data 457 can include an application downloaded to a transceiver 73, 104, and/or 133, or the communication interfaces 467 from the APP STORE® online retail store, from the GOOGLE PLAY® online retail store, or another source of the applications or the CRPI described herein.

Additionally or alternatively, the computing system 450 can include and/or be implemented as a personal computing system (including both laptop computer and non-laptop computer configurations), and/or a server. In some embodiments, the disclosed methods can be implemented as CRPI encoded on a non-transitory computer-readable storage media in a machine-readable format, and/or on other non-transitory media or articles of manufacture.

Figure 13:
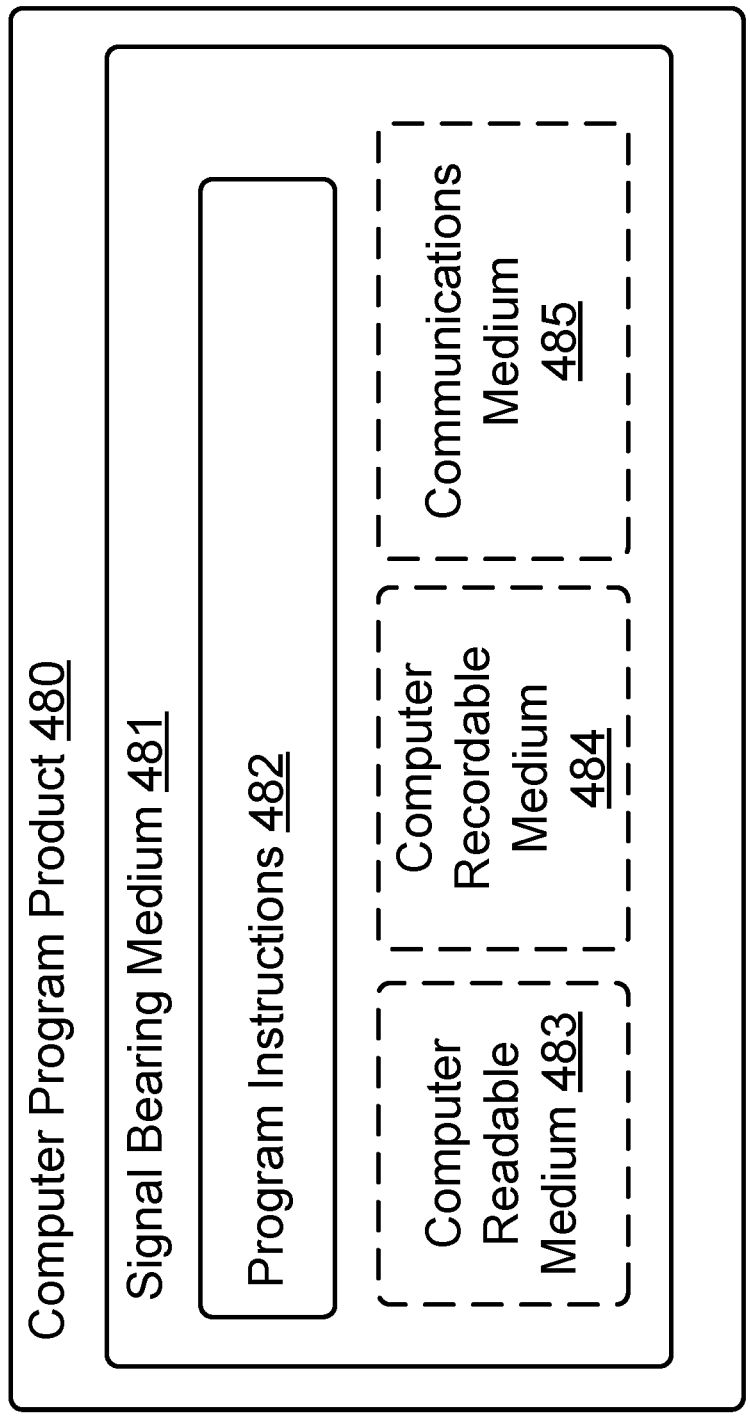
FIG. 13 is a schematic illustrating a conceptual partial view of a computer program product for executing a computer process on a computing system, according to an example embodiment.

FIG. 13 is a schematic illustrating a conceptual partial view of an example computer program product 480 that includes a computer program for executing a computer process on a computing system, arranged according to at least some embodiments presented herein.

The computing system 450 can also include output interfaces 463 that can include a graphics processing unit 464, which can be configured to communicate to various external devices such as display devices 466 and/or speakers via one or more A/V ports 465 or a communication interface 467. The communication interface 467 can include a network controller 468, which can be arranged to facilitate communications with one or more other computing systems 470 over a network communication via one or more communication ports 469. The communication connection is one example of a communication media. Communication media can be embodied by computer-readable program instructions, data structures, program modules, and/or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 480 is provided using a signal bearing medium 481. The signal bearing medium 481 can include one or more programming instructions 482 that, when executed by one or more processors can provide functionality or portions of the functionality described above with respect to FIGS. 1, 2, 3, 4, 5, 6, 7, 8, 9, 10, 11, and 12. In some examples, the signal bearing medium 481 can encompass a computer-readable medium 483, such as, but not limited to, a hard disk drive, a Compact Disc (CD), a Digital Video Disk (DVD), a digital tape, and/or any other CRM described herein. In some implementations, the signal bearing medium 481 can encompass a computer recordable medium 484, such as, but not limited to, memory, read/write (R/W) CDs, R/W DVDs, etc. In some implementations, the signal bearing medium 481 can encompass a communications medium 485, such as, but not limited to, a digital and/or an analog communication medium (e.g., a fiber optic cable, a waveguide, a wired communications link, a wireless communication link, etc.). Thus, for example, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable and/or logic implemented instructions. In some examples, a computing system such as the computing system 450 of FIG. 12 can be configured to provide various operations, functions, and/or actions in response to the programming instructions 482 conveyed to the computing system 450 by one or more of the computer-readable medium 483, the computer recordable medium 484, and/or the communications medium 485.

The processor 101 of CCS 100 or another processor can be configured as the processor 452. The CRM 102 of CCS 100 or another CRM can be configured as part of or all of the system memory 454 or the storage devices 460. The user interface 103 of CCS 100 or another user interface can be configured as part of or all of the output interfaces 463 and the display device(s) 466. The transceiver 104 of CCS 100 or another transceiver can be configured as part of or all of the communication interfaces 467.

VII. Conclusion

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C.

In this description, the terms "data," "information," and "content" are used interchangeably. The data can be transmitted and received. As an example, the transmission of the data can occur directly from a transmitting device (e.g., a transmitter) to a receiving device (e.g., a receiver). As another example, the transmission of the data can occur indirectly from the transmitter to a receiver via one of one or more intermediary network devices, such as an access point, an antenna, a base station, a hub, a modem, a relay, a router, a switch, and/or some other network device. The transmission of the data can include transmitting the data over an air interface (e.g., using radio signals (i.e., wirelessly)). The transmission of the data can include transmitting the data over a wire (e.g., a single wire, a twisted pair of wires, a fiber optic cable, a coaxial cable, a wiring harness, a power line, a printed circuit, a CAT5 cable, and/or CAT6 cable). The wire can be referred to as a "conductor" and/or by another term. As an example, transmission of the data over the conductor can occur electrically or optically.

The data can represent various things such as objects and conditions. The objects and conditions can be mapped to a data structure (e.g., a table). A processor can refer to the data structure to determine what object and/or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

The diagrams, flow charts, and other data shown in the figures are provided merely as examples and are not intended to be limiting. Many of the elements illustrated in the figures and/or described herein are functional elements that can be implemented as discrete or distributed elements and/or in conjunction with other elements, and in any suitable combination and location. Those skilled in the art will appreciate that other arrangements and elements (e.g., machines, interfaces, functions, orders, and/or groupings of functions) can be used instead. Furthermore, various functions described as being performed by one or more elements can be carried out by a processor executing computer-readable program instructions (CRPI) and/or by a combination of hardware, firmware, and/or software. For purposes of this description, execution of CRPI contained in some computer-readable medium to perform some function can include executing all of the program instructions of those CRPI or only a portion of those CRPI.

Example embodiments have been described above. Those skilled in the art will understand that changes and modifications can be made to the described embodiments without departing from the true scope and spirit of the present invention, which is defined by the claims.

Embodiments of the present disclosure may thus relate to one of the enumerated example embodiments (EEEs) listed below.

EEE 1 is a method comprising: receiving, by at least one processor of a computing device, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; displaying, on a display after receiving the download, the image and the at least one symbol; receiving, by the at least one processor while the image and the at least one symbol are displayed on the display, a first input corresponding to selection of the first symbol; receiving, by the at least one processor from the vehicle in response to receiving the first input, data representing at least one value of the first signal; determining, by the at least one processor, a first display-location on the display at which to display the data representing the at least one value of the first signal; and displaying, on the display at the first display-location while the image and the at least one symbol are displayed on the display, the data representing the at least one value of the first signal.

EEE 2 is the method of EEE 1, wherein the first display-location is proximate, in space on the display, to a location at which the first circuit is being displayed on the display.

EEE 3 is the method of EEE 1 or 2, wherein the download further includes a first identifier, and wherein the first identifier identifies at least one of the first circuit and the first signal, the method further comprising: in response to receiving the first input, transmitting, by a transceiver of the computing device, over a network to which the computing device is connected, a first request for the data representing the at least one value of the first signal, wherein the first request includes the first identifier, and wherein receiving the data representing at least one value of the first signal occurs in response to transmitting the first request.

EEE 4 is the method of EEE 3, wherein the first identifier comprises a parameter identifier (PID).

EEE 5 is the method of EEE 3 or 4, wherein receiving the data representing at least one value of the first signal comprises receiving the data over the network from an electronic control unit within the vehicle.

EEE 6 is the method of any one of EEEs 1-5, wherein receiving the data representing at least one value of the first signal comprises receiving the data from an electrical measurement input of the computing device.

EEE 7 is the method of any one of EEEs 1-6, wherein the download further includes a baseline value of the first signal, and wherein the method further comprises: determining, by the at least one processor, a second display-location on the display at which to display the baseline value; and displaying on the display at the second display-location while the image and the at least one symbol are displayed on the display, the baseline value.

EEE 8 is the method of any one of EEEs 1-7, further comprising: receiving, by the at least one processor in response to receiving the first input, a baseline value of the first signal; determining, by the at least one processor, a second display-location on the display at which to display the baseline value; and displaying on the display at the second display-location while the image and the at least one symbol are displayed on the display, the baseline value.

EEE 9 is the method of EEE 7 or 8, wherein the second display-location is distinct from the first display-location.

EEE 10 is the method of any one of EEEs 1-9, wherein the download further includes (i) at least one minimum code setting value of the first signal and (ii) at least one maximum code setting value of the first signal, and wherein displaying the data at the first display-location comprises displaying simultaneously, at the first display-location, the data and the minimum and maximum code setting values.

EEE 11 is the method of any one of EEEs 1-10, wherein the at least one value of the first signal comprises multiple values of the first signal, wherein the multiple values of the first signal comprise a most-recent value of the first signal, a minimum value of the first signal, and a maximum value of the first signal, and wherein displaying the data at the first display-location comprises displaying simultaneously, at the first display-location, the most-recent value of the first signal, the minimum value of the first signal, and the maximum value of the first signal.

EEE 12 is the method of any one of EEEs 1-11, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying both the first and second portions of the image, and wherein the method further comprises: displaying, on the display at the first display-location with the data representing the at least one value of the first signal, a selection graphic associated with the second circuit; receiving, by the at least one processor, a second input corresponding to selection of the selection graphic associated with the second circuit; receiving, by the at least one processor from the vehicle in response to receiving the second input, data representing at least one value of the second signal; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 13 is the method of any one of EEEs 1-12, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying the first portion of the image without displaying the second portion of the image, and wherein the method further comprises: displaying, on the display at the first display-location with the data representing the at least one value of the first signal, a selection graphic associated with the second circuit; receiving, by the at least one processor, a second input corresponding to selection of the selection graphic associated with the second circuit; in response to receiving the second input, (i) receiving, by the at least one processor from the vehicle, data representing at least one value of the second signal and (ii) displaying, on the display, the second portion of the image; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 14 is the method of EEE 13, wherein displaying the second portion of the image comprises displaying the second portion of the image while displaying the first portion of the image.

EEE 15 is the method of EEE 13, wherein displaying the second portion of the image comprises displaying the second portion of the image without displaying the first portion of the image.

EEE 16 is the method of any one of EEEs 12-15, wherein the second display-location is distinct from the first display-location.

EEE 17 is a system comprising: a display; at least one processor; and data storage comprising instructions executable by the at least one processor to cause the system to perform operations comprising: receiving, by the at least one processor, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; displaying, on the display after receiving the download, the image and the at least one symbol; receiving, by the at least one processor while the image and the at least one symbol are displayed on the display, a first input corresponding to selection of the first symbol; receiving, by the at least one processor from the vehicle in response to receiving the first input, data representing at least one value of the first signal; determining, by the at least one processor, a first display-location on the display at which to display the data representing the at least one value of the first signal; and displaying, on the display at the first display-location while the image and the at least one symbol are displayed on the display, the data representing the at least one value of the first signal.

EEE 18 is the system of EEE 17, wherein the first display-location is proximate, in space on the display, to a location at which the first circuit is being displayed on the display.

EEE 19 is the system of EEE 17 or 18, wherein the download further includes a first identifier, and wherein the first identifier identifies at least one of the first circuit and the first signal, the operations further comprising: in response to receiving the first input, transmitting, by a transceiver of the system, over a network to which the system is connected, a first request for the data representing the at least one value of the first signal, wherein the first request includes the first identifier, and wherein receiving the data representing at least one value of the first signal occurs in response to transmitting the first request.

EEE 20 is the system of EEE 19, wherein the first identifier comprises a parameter identifier (PID).

EEE 21 is the system of EEE 19 or 20, wherein receiving the data representing at least one value of the first signal comprises receiving the data over the network from an electronic control unit within the vehicle.

EEE 22 is the system of any one of EEEs 17-21, further comprising: an electrical measurement input, wherein receiving the data representing at least one value of the first signal comprises receiving the data from the electrical measurement input.

EEE 23 is the system of any one of EEEs 17-22, wherein the download further includes a baseline value of the first signal, and wherein the operations further comprise: determining, by the at least one processor, a second display-location on the display at which to display the baseline value; and displaying on the display at the second display-location while the image and the at least one symbol are displayed on the display, the baseline value.

EEE 24 is the system of any one of EEEs 17-23, further comprising: receiving, by the at least one processor in response to receiving the first input, a baseline value of the first signal; determining, by the at least one processor, a second display-location on the display at which to display the baseline value; and displaying on the display at the second display-location while the image and the at least one symbol are displayed on the display, the baseline value.

EEE 25 is the system of EEE 23 or 24, wherein the second display-location is distinct from the first display-location.

EEE 26 is the system of any one of EEEs 17-25, wherein the download further includes (i) at least one minimum code setting value of the first signal and (ii) at least one maximum code setting value of the first signal, and wherein displaying the data at the first display-location comprises displaying simultaneously, at the first display-location, the data and the minimum and maximum code setting values.

EEE 27 is the system of any one of EEEs 17-26, wherein the at least one value of the first signal comprises multiple values of the first signal, wherein the multiple values of the first signal comprise a most-recent value of the first signal, a minimum value of the first signal, and a maximum value of the first signal, and wherein displaying the data at the first display-location comprises displaying simultaneously, at the first display-location, the most-recent value of the first signal, the minimum value of the first signal, and the maximum value of the first signal.

EEE 28 is the system of any one of EEEs 17-27, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying both the first and second portions of the image, and wherein the operations further comprise: displaying, on the display at the first display-location with the data representing the at least one value of the first signal, a selection graphic associated with the second circuit; receiving, by the at least one processor, a second input corresponding to selection of the selection graphic associated with the second circuit; receiving, by the at least one processor from the vehicle in response to receiving the second input, data representing at least one value of the second signal; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 29 is the system of any one of EEEs 17-28, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying the first portion of the image without displaying the second portion of the image, and wherein the operations further comprise: displaying, on the display at the first display-location with the data representing the at least one value of the first signal, a selection graphic associated with the second circuit; receiving, by the at least one processor, a second input corresponding to selection of the selection graphic associated with the second circuit; in response to receiving the second input, (i) receiving, by the at least one processor from the vehicle, data representing at least one value of the second signal and (ii) displaying, on the display, the second portion of the image; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 30 is the system of EEE 29, wherein displaying the second portion of the image comprises displaying the second portion of the image while displaying the first portion of the image.

EEE 31 is the system of EEE 29, wherein displaying the second portion of the image comprises displaying the second portion of the image without displaying the first portion of the image.

EEE 32 is the system of any one of EEEs 29-31, wherein the second display-location is distinct from the first display-location.

EEE 33 is the system of any one of EEEs 17-32, further comprising: a transceiver configured for communication with one or more entities over a network to which the system and the one or more entities are connected, wherein receiving, by the at least one processor from the vehicle in response to receiving the first input, the data representing at least one value of the first signal comprises receiving, by the at least one processor over the network from the vehicle via the transceiver in response to receiving the first input, the data representing at least one value of the first signal.

EEE 34 is the system of EEE 33, wherein the one or more entities includes the vehicle, wherein the vehicle is connected to the network, and wherein the transceiver is included as part of a data link connector (DLC) interface configured for data communication between the system and the vehicle over the network.

EEE 35 is a non-transitory computer readable medium having stored thereon instructions that, upon execution by a computing system, cause the computing system to perform operations comprising: receiving, by at least one processor of the computing system, a download including (i) an image representative of at least one circuit of a vehicle component in a vehicle, the at least one circuit including a first circuit configured for carrying a first signal within the vehicle, and (ii) symbol data associated with at least one symbol, the at least one symbol including a first symbol, wherein data representing values of the first signal can be received by the at least one processor; displaying, on a display after receiving the download, the image and the at least one symbol; receiving, by the at least one processor while the image and the at least one symbol are displayed on the display, a first input corresponding to selection of the first symbol; receiving, by the at least one processor from the vehicle in response to receiving the first input, data representing at least one value of the first signal; determining, by the at least one processor, a first display-location on the display at which to display the data representing the at least one value of the first signal; and displaying, on the display at the first display-location while the image and the at least one symbol are displayed on the display, the data representing the at least one value of the first signal.

EEE 36 is the non-transitory computer readable medium of EEE 35, wherein the first display-location is proximate, in space on the display, to a location at which the first circuit is being displayed on the display.

EEE 37 is the non-transitory computer readable medium of EEE 35 or 36, wherein the download further includes a first identifier, and wherein the first identifier identifies at least one of the first circuit and the first signal, the operations further comprising: in response to receiving the first input, transmitting, by a transceiver of the computing system, over a network to which the computing system is connected, a first request for the data representing the at least one value of the first signal, wherein the first request includes the first identifier, and wherein receiving the data representing at least one value of the first signal occurs in response to transmitting the first request.

EEE 38 is the non-transitory computer readable medium of EEE 37, wherein the first identifier comprises a parameter identifier (PID).

EEE 39 is the non-transitory computer readable medium of EEE 37 or 38, wherein receiving the data representing at least one value of the first signal comprises receiving the data over the network from an electronic control unit within the vehicle.

EEE 40 is the non-transitory computer readable medium of any one of EEEs 35-39, wherein receiving the data representing at least one value of the first signal comprises receiving the data from an electrical measurement input of the computing system.

EEE 41 is the non-transitory computer readable medium of any one of EEEs 35-40, wherein the download further includes a baseline value of the first signal, and wherein the operations further comprise: determining, by the at least one processor, a second display-location on the display at which to display the baseline value; and displaying on the display at the second display-location while the image and the at least one symbol are displayed on the display, the baseline value.

EEE 42 is the non-transitory computer readable medium of any one of EEEs 35-41, further comprising: receiving, by the at least one processor in response to receiving the first input, a baseline value of the first signal; determining, by the at least one processor, a second display-location on the display at which to display the baseline value; and displaying on the display at the second display-location while the image and the at least one symbol are displayed on the display, the baseline value.

EEE 43 is the non-transitory computer readable medium of EEE 41 or 42, wherein the second display-location is distinct from the first display-location.

EEE 44 is the non-transitory computer readable medium of any one of EEEs 35-43, wherein the download further includes (i) at least one minimum code setting value of the first signal and (ii) at least one maximum code setting value of the first signal, and wherein displaying the data at the first display-location comprises displaying simultaneously, at the first display-location, the data and the minimum and maximum code setting values.

EEE 45 is the non-transitory computer readable medium of any one of EEEs 35-44, wherein the at least one value of the first signal comprises multiple values of the first signal, wherein the multiple values of the first signal comprise a most-recent value of the first signal, a minimum value of the first signal, and a maximum value of the first signal, and wherein displaying the data at the first display-location comprises displaying simultaneously, at the first display-location, the most-recent value of the first signal, the minimum value of the first signal, and the maximum value of the first signal.

EEE 46 is the non-transitory computer readable medium of any one of EEEs 35-45, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying both the first and second portions of the image, and wherein the operations further comprise: displaying, on the display at the first display-location with the data representing the at least one value of the first signal, a selection graphic associated with the second circuit; receiving, by the at least one processor, a second input corresponding to selection of the selection graphic associated with the second circuit; receiving, by the at least one processor from the vehicle in response to receiving the second input, data representing at least one value of the second signal; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 47 is the non-transitory computer readable medium of any one of EEEs 35-46, wherein the at least one circuit further includes, in addition to the first circuit, a second circuit related to the first circuit, the second circuit configured for carrying a second signal within the vehicle, wherein the image includes a first portion representative of the first circuit and a second portion representative of the second circuit, wherein displaying the image comprises displaying the first portion of the image without displaying the second portion of the image, and wherein the operations further comprise: displaying, on the display at the first display-location with the data representing the at least one value of the first signal, a selection graphic associated with the second circuit; receiving, by the at least one processor, a second input corresponding to selection of the selection graphic associated with the second circuit; in response to receiving the second input, (i) receiving, by the at least one processor from the vehicle, data representing at least one value of the second signal and (ii) displaying, on the display, the second portion of the image; determining, by the at least one processor, a second display-location on the display at which to display the data representing the at least one value of the second signal; and displaying, on the display at the second display-location while the image, the at least one symbol, and the data representing the at least one value of the first signal are displayed on the display, the data representing the at least one value of the second signal.

EEE 48 is the non-transitory computer readable medium of EEE 47, wherein displaying the second portion of the image comprises displaying the second portion of the image while displaying the first portion of the image.

EEE 49 is the non-transitory computer readable medium of EEE 48, wherein displaying the second portion of the image comprises displaying the second portion of the image without displaying the first portion of the image.

EEE 50 is the non-transitory computer readable medium of any one of EEEs 47-49, wherein the second display-location is distinct from the first display-location.

What is claimed is:

1. A system comprising:
a display;
one or more processors;
and
non-transitory computer-readable data storage
comprising instructions executable by the one or more processors to cause the system to:
transmit, via a first network, a message to a vehicle, wherein the first network is established between the system and the vehicle;
receive, at the system via the first network in response to the message, data indicative of a diagnostic trouble code corresponding to a failure condition of the vehicle;
transmit, via a second network different than the first network, a first request from the system to a server, wherein the first request includes the diagnostic trouble code and a vehicle identifier corresponding to the vehicle;
receive, at the system from the server via the second network, a response to the first request, wherein the response includes a first image and a second image, and wherein the first image includes a representation of a first circuit configured for carrying within the vehicle a first signal useable to diagnose the diagnostic trouble code, and the second image includes a representation of a second circuit configured for carrying within the vehicle a second signal useable to diagnose the diagnostic trouble code;
display, on the display without displaying the second image on the display, the first image and a selection graphic corresponding to the second circuit;
receive a first input corresponding to selection of the selection graphic corresponding to the second circuit;
in response to receiving the first input, display both the first image and the second image on the display simultaneously;
receive a second input corresponding to a selection of the first circuit or the second circuit;
transmit, via the first network in response to the second input, a second request for data representing at least one value of the first signal if the first circuit was selected or data representing at least one value of the second signal if the second circuit was selected;
receive, from the vehicle in response to the second request, the data representing at least one value of the first signal if the first circuit was selected or the data representing at least one value of the second signal if the second circuit was selected; and
display, on the display while the first image and the second image are displayed on the display, the data representing at least one value of the first signal if the first circuit was selected or the data representing at least one value of the second signal if the second circuit was selected.

2. The system of claim 1, further comprising:
one or more transceivers, wherein:
a first selectable symbol corresponds to the first circuit, and
the selection of the first circuit includes a selection of the first selectable symbol.

3. The system of claim 1, wherein the data representing at least one value of the first signal if the first circuit was selected is displayed within a threshold number of pixels to a location at which the first circuit is displayed on the display.

4. The system of claim 2, wherein:
the non-transitory computer-readable data storage also comprises symbol data, and
the symbol data includes at least one coordinate point indicating where on the first image to display the first selectable symbol.

5. The system of claim 4, wherein:
the at least one coordinate point includes a set of pixel coordinate points that identify a region within a predetermined threshold distance from the first selectable symbol,
the non-transitory computer-readable data storage also comprises instructions executable by the one or more processors to cause the system to:
make a determination that a user interface selector has entered the region within the predetermined threshold distance from the first selectable symbol; and
perform an action in response to the determination, and
the action includes an action to: request information from a server, display a pop-up window, or display a pop-up menu.

6. The system of claim 4, wherein the at least one coordinate point includes a default set of coordinate points for a default size of the first image.

7. The system of claim 1, wherein:
the non-transitory computer-readable data storage also comprises: (i) a minimum code setting value corresponding to the first signal, and (ii) a maximum code setting value corresponding to the first signal, and
the non-transitory computer-readable data storage also comprises instructions executable by the one or more processors to cause the system to display, on the display simultaneously, the data representing at least one value of the first signal, the minimum code setting value, and the maximum code setting value.

8. The system of claim 2, wherein:
the non-transitory computer-readable data storage also comprises a baseline value of the first signal,
the baseline value is based, at least in part, on a measurement of one or more comparable signals produced within one or more other vehicles,
the comparable signals and the first signal are output by a common type of vehicle component, and
the non-transitory computer-readable data storage also comprises instructions executable by the one or more processors to cause the system to display, on the display while the first image and the first selectable symbol are displayed on the display, the data representing at least one value of the first signal within the vehicle and the baseline value.

9. The system of claim 1, wherein:
the second request for data representing at least one value of the first signal if the first circuit was selected or data representing at least one value of the second signal if the second circuit was selected includes a single request for the vehicle to periodically or continuously transmit a most-recent measured value of the first signal or the second signal, and
the data representing at least one value of the first signal within the vehicle includes multiple values of the first signal or the data representing at least one value of the second signal includes multiple values of the second signal.

10. The system of claim 1, further comprising:
one or more transceivers, wherein:
the non-transitory computer-readable data storage also comprises a first parameter identifier and an electronic control unit identifier,
the first parameter identifier corresponds to the first circuit and/or the first signal,
the electronic control unit identifier corresponds to an electronic control unit within the vehicle that is operable to transmit a vehicle data message that includes the first parameter identifier and the data representing at least one value of the first signal within the vehicle, and
the non-transitory computer-readable data storage also comprises instructions executable by the one or more processors to cause the system to receive the vehicle data message, whereby the system receives the data representing at least one value of the first signal within the vehicle.

11. The system of claim 10, wherein the vehicle data message is arranged according to a vehicle data message protocol selected from among: a Society of Automotive Engineers J1850 vehicle data message protocol, a controller area network vehicle data message protocol, or a K-Line vehicle data message protocol.

12. The system of claim 10, wherein:
the one or more transceivers include a transceiver of a data link connector interface that is connected directly to a data link connector within the vehicle, and
the data link connector within the vehicle is arranged according to a Society of Automotive Engineers J1962 specification.

13. The system of claim 1, wherein:
the non-transitory computer-readable data storage also comprises instructions executable by the one or more processors to cause the system to display, on the display simultaneously, a most-recent value of the first signal, a minimum value of the first signal, and a maximum value of the first signal.

14. The system of claim 1, wherein the non-transitory computer-readable data storage also comprises instructions executable by the one or more processors to cause the system to:
in response to the first input, (i) receive, from the vehicle, data representing at least one value of the second signal and (ii) display, on the display, the second image; and
display, on the display while the first image and the data representing at least one value of the first signal are displayed on the display, the second image and the data representing at least one value of the second signal.

15. The system of claim 1, further comprising:
a digital volt-ohmmeter or a digital multimeter,
wherein the non-transitory computer-readable data storage also comprises instructions executable by the one or more processors to receive data representing at least one value of the first signal from the digital volt-ohmmeter or the digital multimeter.

16. The system of claim 1, wherein the first signal includes an electrical signal or an optical signal.

17. The system of claim 1, wherein the non-transitory computer-readable data storage also comprises instructions executable by the one or more processors to cause the system to display the second image on the display without displaying the first image on the display.

18. The system of claim 1, wherein the first image and the second image are scalable vector graphic images not captured by a camera.

19. The system of claim 2, wherein the first image includes the first selectable symbol.

20. A method comprising:
transmitting, via a first network, a message from a computing system to a vehicle, wherein the first network is established between the computing system and the vehicle;

receiving, at the computing system via the first network in response to the message, data indicative of a diagnostic trouble code corresponding to a failure condition of the vehicle;

transmitting, via a second network different than the first network, a first request from the computing system to a server, wherein the first request includes the diagnostic trouble code and a vehicle identifier corresponding to the vehicle;

receiving, at the computing system from the server via the second network, a response to the first request, wherein the response includes a first image and a second image, and wherein the first image includes a representation of a first circuit configured for carrying within the vehicle a first signal useable to diagnose the diagnostic trouble code, and the second image includes a representation of a second circuit configured for carrying within the vehicle a second signal useable to diagnose the diagnostic trouble code;

displaying, on a display without displaying the second image on the display, the first image and a selection graphic corresponding to the second circuit;

receiving a first input corresponding to selection of the selection graphic corresponding to the second circuit;

in response to receiving the first input, displaying both the first image and the second image on the display simultaneously;

receiving a second input corresponding to a selection of the first circuit or the second circuit;

transmitting, via the first network in response to the second input, a second request for data representing at least one value of the first signal if the first circuit was selected or data representing at least one value of the second signal if the second circuit was selected;

receiving, from the vehicle in response to the second request, the data representing at least one value of the first signal if the first circuit was selected or the data representing at least one value of the second signal if the second circuit was selected; and displaying, on the display while the first image and the second image are displayed on the display, the data representing at least one value of the first signal if the first circuit was selected or the data representing at least one value of the second signal if the second circuit was selected.

21. The method of claim 20, wherein the first image and the second image are scalable vector graphic images not captured by a camera.

22. A non-transitory computer-readable memory having stored thereon instructions that, upon execution by one or more processors of a computing system including a display and a transceiver, cause the computing system to:

transmit, via a first network, a message from the computing system to a vehicle, wherein the first network is established between the computing system and the vehicle;

receive, at the computing system via the first network in response to the message, data indicative of a diagnostic trouble code corresponding to a failure condition of the vehicle;

transmit, via a second network different than the first network, a first request from the computing system to a server, wherein the first request includes the diagnostic trouble code and a vehicle identifier corresponding to the vehicle;

receive at the computing system from the server via the second network, a response to the first request, wherein the response includes a first image and a second image, and wherein the first image includes a representation of a first circuit configured for carrying within the vehicle a first signal useable to diagnose the diagnostic trouble code, and the second image includes a representation of a second circuit configured for carrying within the vehicle a second signal useable to diagnose the diagnostic trouble code;

display, on the display without displaying the second image on the display, the first image and a selection graphic corresponding to the second circuit;

receive a first input corresponding to selection of the selection graphic corresponding to the second circuit; and in response to receiving the first input, display both the first image and the second scalable image on the display simultaneously;

receive a second input corresponding to a selection of the first circuit or the second circuit;

transmit, via the first network in response to the second input, a second request for data representing at least one value of the first signal if the first circuit was selected or data representing at least one value of the second signal if the second circuit was selected;

receive, from the vehicle in response to the second request, the data representing at least one value of the first signal if the first circuit was selected or the data representing at least one value of the second signal if the second circuit was selected; and display, on the display while the first image and the second image are displayed on the display, the data representing at least one value of the first signal if the first circuit was selected or the data representing at least one value of the second signal if the second circuit was selected.

23. The non-transitory computer-readable memory of claim 22, wherein the first image and the second image are scalable vector graphic images not captured by a camera.

* * * * *